US012659055B2

(12) United States Patent
Manolakos et al.

(10) Patent No.: US 12,659,055 B2
(45) Date of Patent: Jun. 16, 2026

(54) REFERENCE SIGNAL RECEIVED POWER (RSRP) CHANGE THRESHOLD REFERENCE AND RELATION TO THE TIMING ADVANCE (TA) VALIDITY PROCEDURE FOR AREA-SPECIFIC SOUNDING REFERENCE SIGNALS (SRS) FOR POSITIONING

(71) Applicant: QUALCOMM Incorporated, San Diego, CA (US)

(72) Inventors: Alexandros Manolakos, Athens (GR); Carlos Cabrera Mercader, Cardiff, CA (US); Sony Akkarakaran, Poway, CA (US); Jae Ho Ryu, San Diego, CA (US); Sven Fischer, Nuremberg (DE); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/612,323

(22) Filed: Mar. 21, 2024

(65) Prior Publication Data

US 2024/0340094 A1     Oct. 10, 2024

Related U.S. Application Data

(60) Provisional application No. 63/494,729, filed on Apr. 6, 2023.

(51) Int. Cl.
H04B 17/21          (2015.01)
H04B 17/318         (2015.01)
(Continued)

(52) U.S. Cl.
CPC ........... H04B 17/21 (2015.01); H04B 17/328 (2023.05); H04W 48/20 (2013.01); H04W 76/20 (2018.02)

(58) Field of Classification Search
CPC ...... H04B 17/21; H04B 17/328; H04W 48/20
See application file for complete search history.

(56) References Cited

U.S. PATENT DOCUMENTS

2010/0195618 A1*   8/2010   Park .................... H04W 36/324
                                                        370/331
2011/0110254 A1*   5/2011   Ji ....................... H04W 36/0066
                                                        370/252
(Continued)

FOREIGN PATENT DOCUMENTS

WO          2023040822 A1      3/2023

OTHER PUBLICATIONS

Intel Corporation: "On Low Power High Accuracy Positioning", 3GPP TSG RAN WG1 Meeting #113, R1-2304832, Type Discussion, NR_POS_ENH2-CORE, 3rd Generation Partnership Project, Mobile Competence Centre, 650, Route Des Lucioles, F-06921 Sophia-Antipolis Cedex, France, vol. 3GPP Ran 1, No. Incheon, Korea, May 22, 2023-May 26, 2023, 10 Pages, May 14, 2023, XP052310287, The whole document.
(Continued)

*Primary Examiner* — Brenda H Pham
(74) *Attorney, Agent, or Firm* — Muncy, Geissler, Olds & Lowe, P.C.

(57)          ABSTRACT

Disclosed are techniques for wireless communication. In an aspect, a user equipment (UE) obtains, from a first cell, a first downlink reference timing and a first reference signal received power (RSRP) measurement, wherein the first RSRP measurement is a first reference RSRP, determines that the first downlink reference timing has changed based on a cell reselection from the first cell to the second cell performed while in a radio resource control (RRC) non-connected state, and obtains, from the second cell, while in the RRC non-connected state, based on the first downlink reference timing having changed more than a threshold, a
(Continued)

1300

UE

Obtain, from a first cell, a first downlink reference timing and a first reference signal received power (RSRP) measurement, wherein the first RSRP measurement is a first reference RSRP for an RSRP change computation — 1310

Determine that the first downlink reference timing has changed based on a cell reselection from the first cell to the second cell performed while in a radio resource control (RRC) non-connected state — 1320

Obtain, from the second cell, while in the RRC non-connected state, based on the first downlink reference timing having changed more than a threshold, a second downlink timing and a second RSRP measurement, wherein the second RSRP measurement is a second reference RSRP for the RSRP change computation — 1330 second downlink timing and a second RSRP measurement, wherein the second RSRP measurement is a second reference RSRP.

20 Claims, 19 Drawing Sheets

(51) Int. Cl.
*H04W 48/20*           (2009.01)
*H04W 76/20*           (2018.01)

(56)                References Cited

U.S. PATENT DOCUMENTS

| | | | |
|---|---|---|---|
| 2018/0041936 A1* | 2/2018 | Kim | H04W 72/51 |
| 2019/0014548 A1 | 1/2019 | Pelletier et al. | |
| 2024/0224222 A1 | 7/2024 | Si et al. | |

OTHER PUBLICATIONS

International Search Report and Written Opinion—PCT/US2024/ 021358—ISA/EPO—Jul. 16, 2024.
Vivo: "Discussion on Low Power High Accuracy Positioning", 3GPP TSG RAN WG1 #113, R1-2304488, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, 11 Pages, May 15, 2023, XP052385030, The whole document.

\* cited by examiner

SDT Procedure #2: Measurement Reporting Phase

800
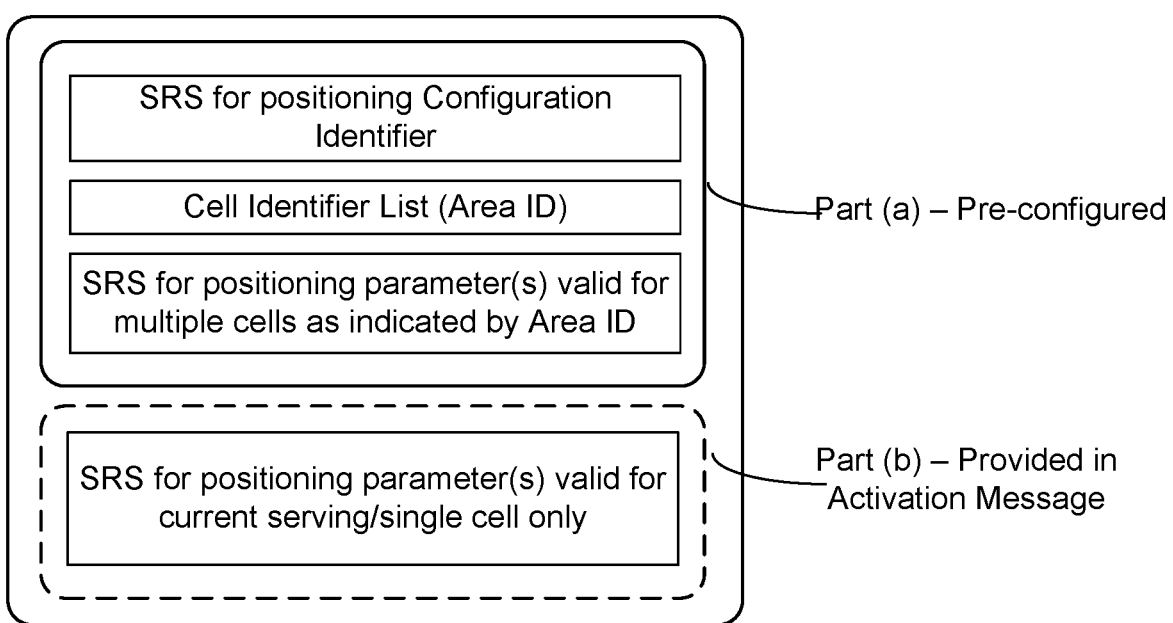
SRS for positioning Configuration Identifier
Cell Identifier List (Area ID)
SRS for positioning parameter(s) valid for multiple cells as indicated by Area ID
Part (a) – Pre-configured
SRS for positioning parameter(s) valid for current serving/single cell only
Part (b) – Provided in Activation Message
*FIG. 8*

```
SRS-PosRRC-Inactive-r18 ::= SEQUENCE (SIZE(1..maxPreConfig)) of SRS-PosRRC-InactivePreConfig-r18)

SRS-PosRRC-InactivePreConfig-r18 ::= SEQUENCE {
    srs-PosID-r18                               INTEGER (1..maxIDs),
    srs-ValidityArea-r18                        Area-ID-CellList-r18,
    srs-PosConfigNUL-r18                        SRS-PosConfig-r18,
    srs-PosConfigSUL-r18                        SRS-PosConfig-r18,
    bwp-NUL-r18                                 BWP,
    bwp-SUL-r18                                 BWP,
    inactivePosSRS-TimeAlignmentTimer-r18       TimeAlignmentTimer,
    inactivePosSRS-RSRP-changeThreshold-r18     RSRP-ChangeThreshold-r18
}
```

REFERENCE SIGNAL RECEIVED POWER (RSRP) CHANGE THRESHOLD REFERENCE AND RELATION TO THE TIMING ADVANCE (TA) VALIDITY PROCEDURE FOR AREA-SPECIFIC SOUNDING REFERENCE SIGNALS (SRS) FOR POSITIONING

CROSS-REFERENCE TO RELATED APPLICATIONS

The present application for patent claims the benefit of U.S. Provisional Application No. 63/494,729, entitled "REFERENCE SIGNAL RECEIVED POWER (RSRP) CHANGE THRESHOLD REFERENCE AND RELATION TO THE TIMING ADVANCE (TA) VALIDITY PROCE- DURE FOR AREA-SPECIFIC SOUNDING REFERENCE SIGNALS (SRS) FOR POSITIONING," filed Apr. 6, 2023, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digi- tal wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless com- munication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to pro- vide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the follow- ing summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication per- formed by a user equipment (UE) includes obtaining, from a first cell, a first downlink reference timing and a first reference signal received power (RSRP) measurement, wherein the first RSRP measurement is a first reference RSRP for an RSRP change computation; determining that the first downlink reference timing has changed based on a cell reselection from the first cell to the second cell per- formed while in a radio resource control (RRC) non-con- nected state; and obtaining, from the second cell, while in the RRC non-connected state, based on the first downlink reference timing having changed more than a threshold, a second downlink timing and a second RSRP measurement, wherein the second RSRP measurement is a second refer- ence RSRP for the RSRP change computation.

In an aspect, a user equipment (UE) includes a memory; at least one transceiver; and at least one processor commu- nicatively coupled to the memory and the at least one transceiver, the at least one processor configured to: obtain, from a first cell, a first downlink reference timing and a first reference signal received power (RSRP) measurement, wherein the first RSRP measurement is a first reference RSRP for an RSRP change computation; determine that the first downlink reference timing has changed based on a cell reselection from the first cell to the second cell performed while in a radio resource control (RRC) non-connected state; and obtain, from the second cell, while in the RRC non- connected state, based on the first downlink reference timing having changed more than a threshold, a second downlink timing and a second RSRP measurement, wherein the sec- ond RSRP measurement is a second reference RSRP for the RSRP change computation.

In an aspect, a user equipment (UE) includes means for obtaining, from a first cell, a first downlink reference timing and a first reference signal received power (RSRP) mea- surement, wherein the first RSRP measurement is a first reference RSRP for an RSRP change computation; means for determining that the first downlink reference timing has changed based on a cell reselection from the first cell to the second cell performed while in a radio resource control (RRC) non-connected state; and means for obtaining, from the second cell, while in the RRC non-connected state, based on the first downlink reference timing having changed more than a threshold, a second downlink timing and a second RSRP measurement, wherein the second RSRP measure- ment is a second reference RSRP for the RSRP change computation.

In an aspect, a non-transitory computer-readable medium stores computer-executable instructions that, when executed by a user equipment (UE), cause the UE to: obtain, from a first cell, a first downlink reference timing and a first reference signal received power (RSRP) measurement, wherein the first RSRP measurement is a first reference RSRP for an RSRP change computation; determine that the first downlink reference timing has changed based on a cell reselection from the first cell to the second cell performed while in a radio resource control (RRC) non-connected state; and obtain, from the second cell, while in the RRC non- connected state, based on the first downlink reference timing having changed more than a threshold, a second downlink timing and a second RSRP measurement, wherein the second RSRP measurement is a second reference RSRP for the RSRP change computation.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates an example RRC "SRS-PosRRC-Inactive" IE, according to aspects of the disclosure.

FIG. 11 is a diagram illustrating a preconfigured positioning sounding reference signal (SRS) structure, according to aspects of the disclosure.

DETAILED DESCRIPTION

Figure 1:
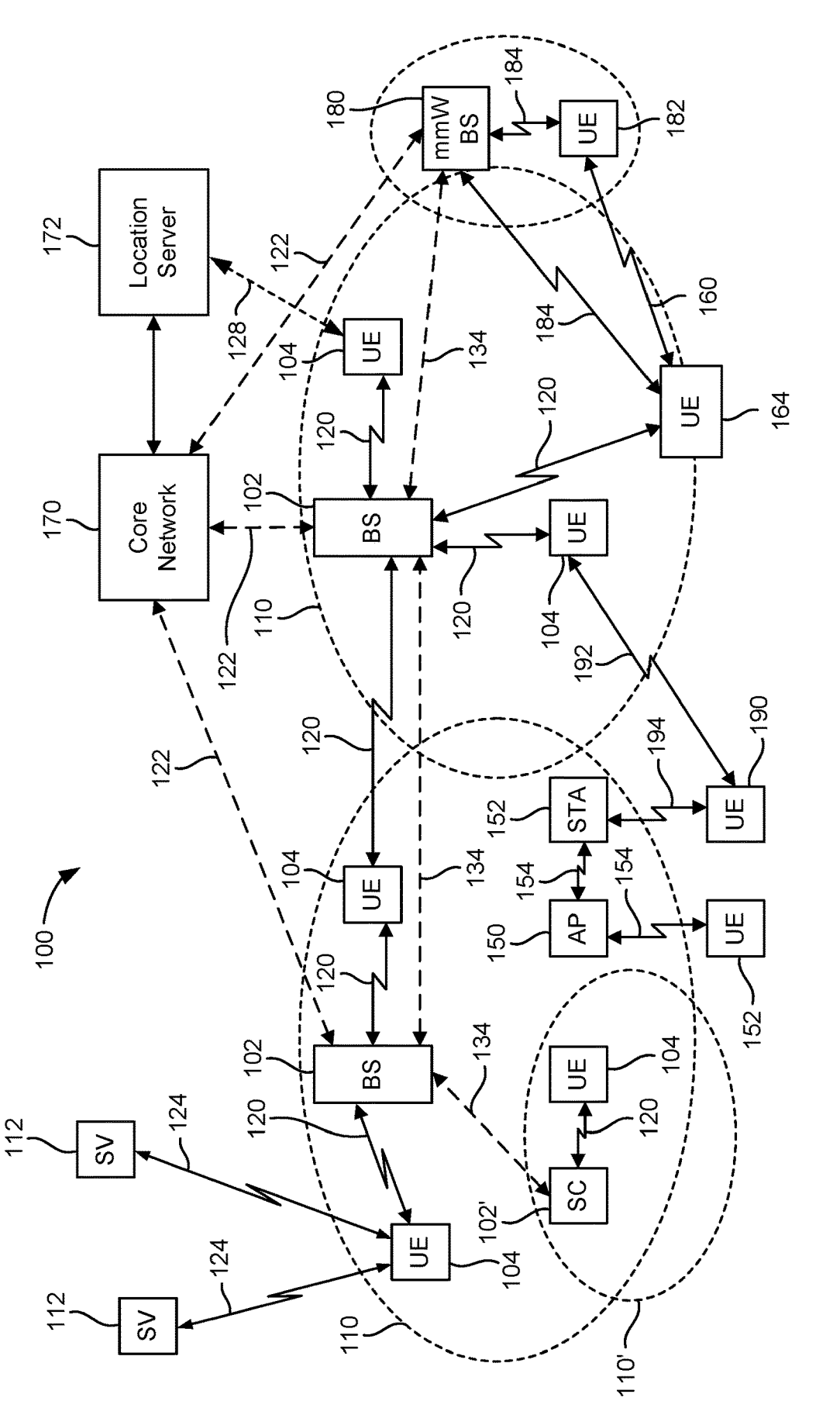
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to wireless positioning. Some aspects more specifically relate to timing advance (TA) validity procedures for area-specific sounding reference signal (SRS) for positioning transmissions. In some examples, with an area-specific SRS for positioning configuration, if a user equipment (UE) determines that a downlink reference time has changed, the UE may autonomously adjust the previous valid TA, a new valid TA may be received, or the UE may determine the new valid TA is equal to or very similar to the previous valid TA. More specifically, the UE may obtain, from a first cell, a first downlink reference timing and a first reference signal received power (RSRP) measurement, where the first RSRP measurement is a first reference RSRP for an RSRP change computation. The UE may then determine that the first downlink reference timing has changed based on a cell reselection from the first cell to a second cell performed while in a radio resource control (RRC) non-connected state. The UE may then obtain, from the second cell, while in the RRC non-connected state, based on the first downlink reference timing having changed more than a threshold, a second downlink timing and a second RSRP measurement, where the second RSRP measurement is a second reference RSRP for the RSRP change computation.

Particular aspects of the subject matter described in this disclosure can be implemented to realize one or more of the following potential advantages. In some examples, by providing rules for UE behavior when the UE determines that a downlink reference time has changed, the described techniques can be used to enable the UE to autonomously adjust the reference RSRP when adjusting the valid TA.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs)

152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). It should be understood that although a portion of FR1 is greater than 6 GHZ, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN)

technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
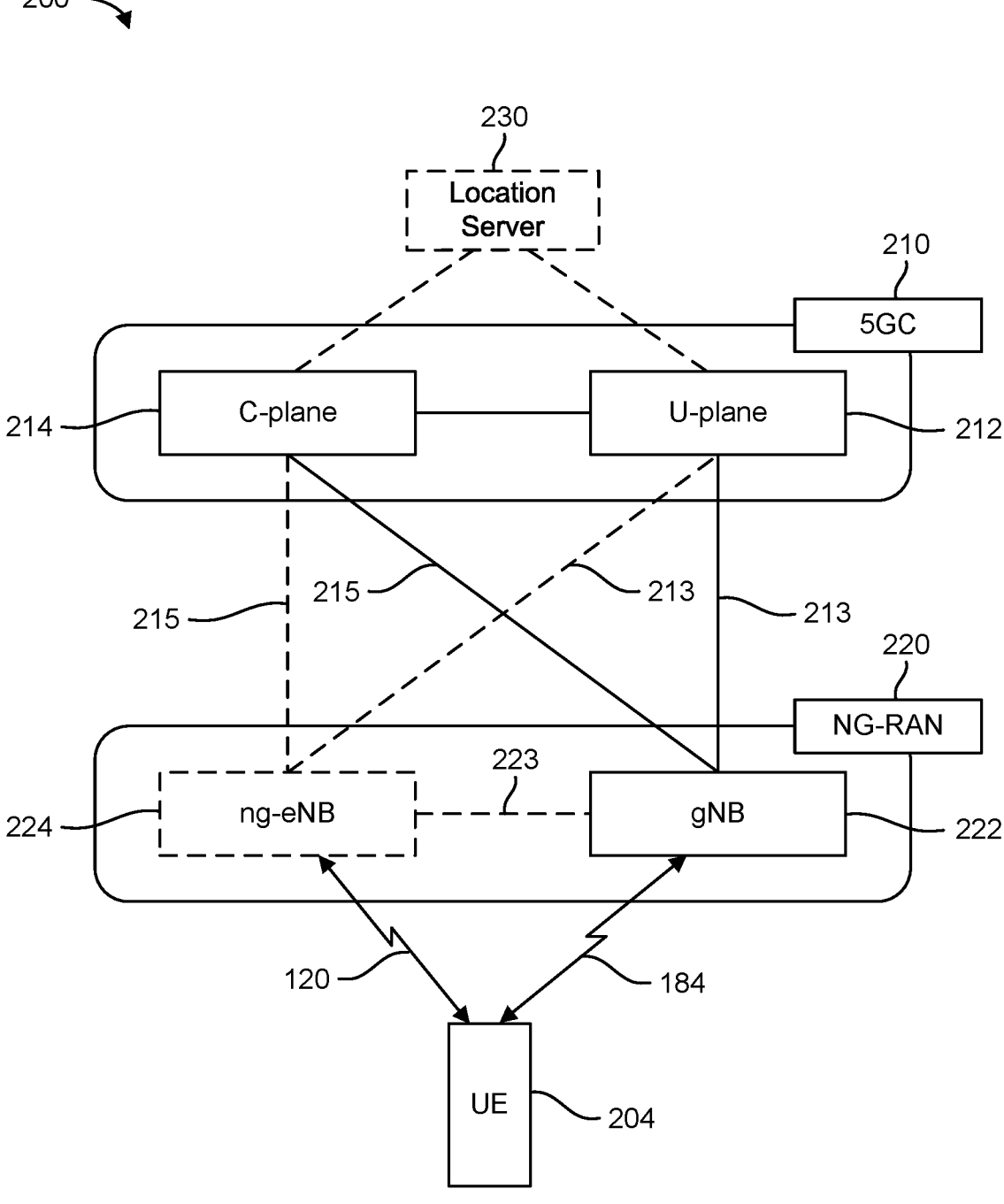
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
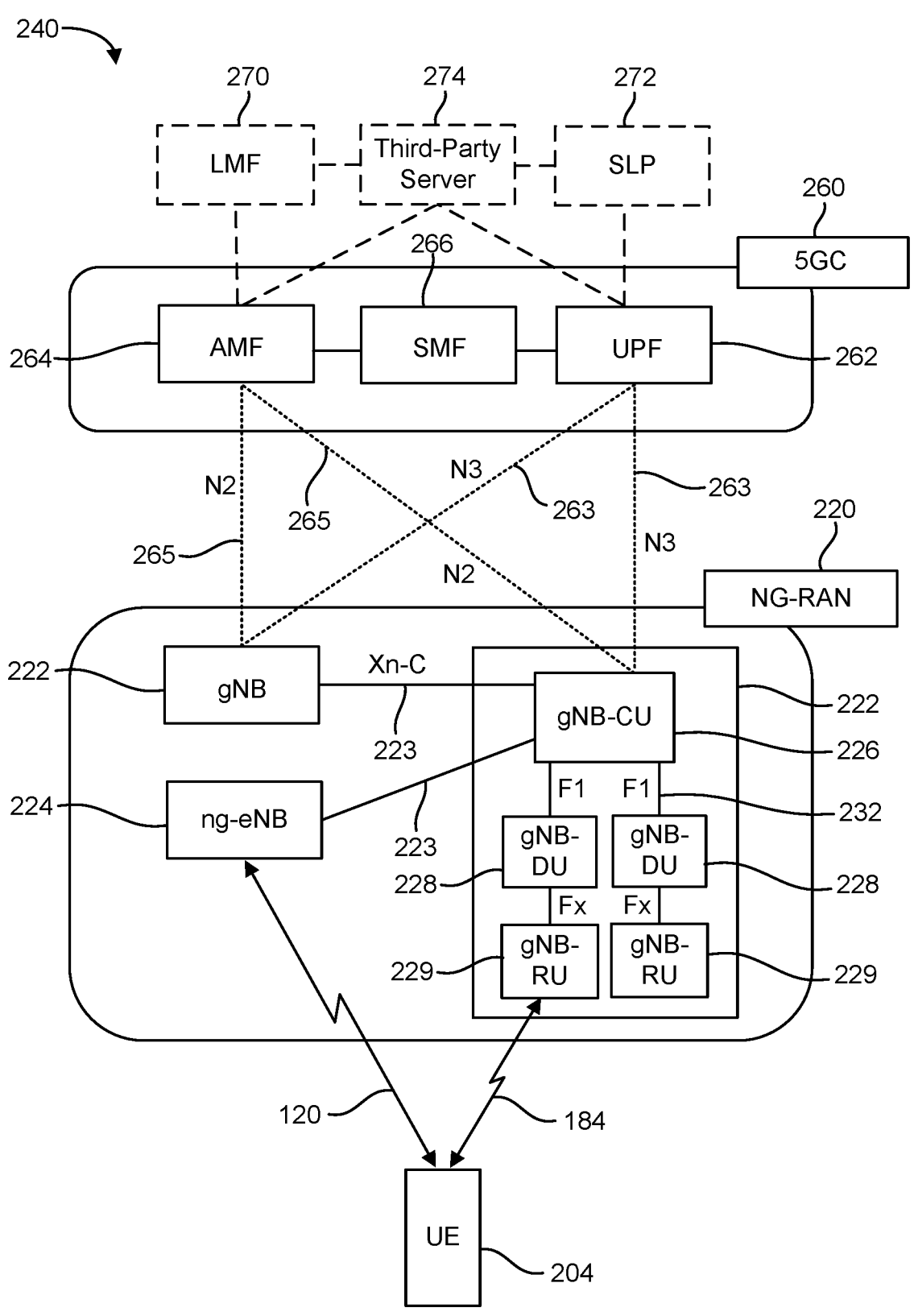

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
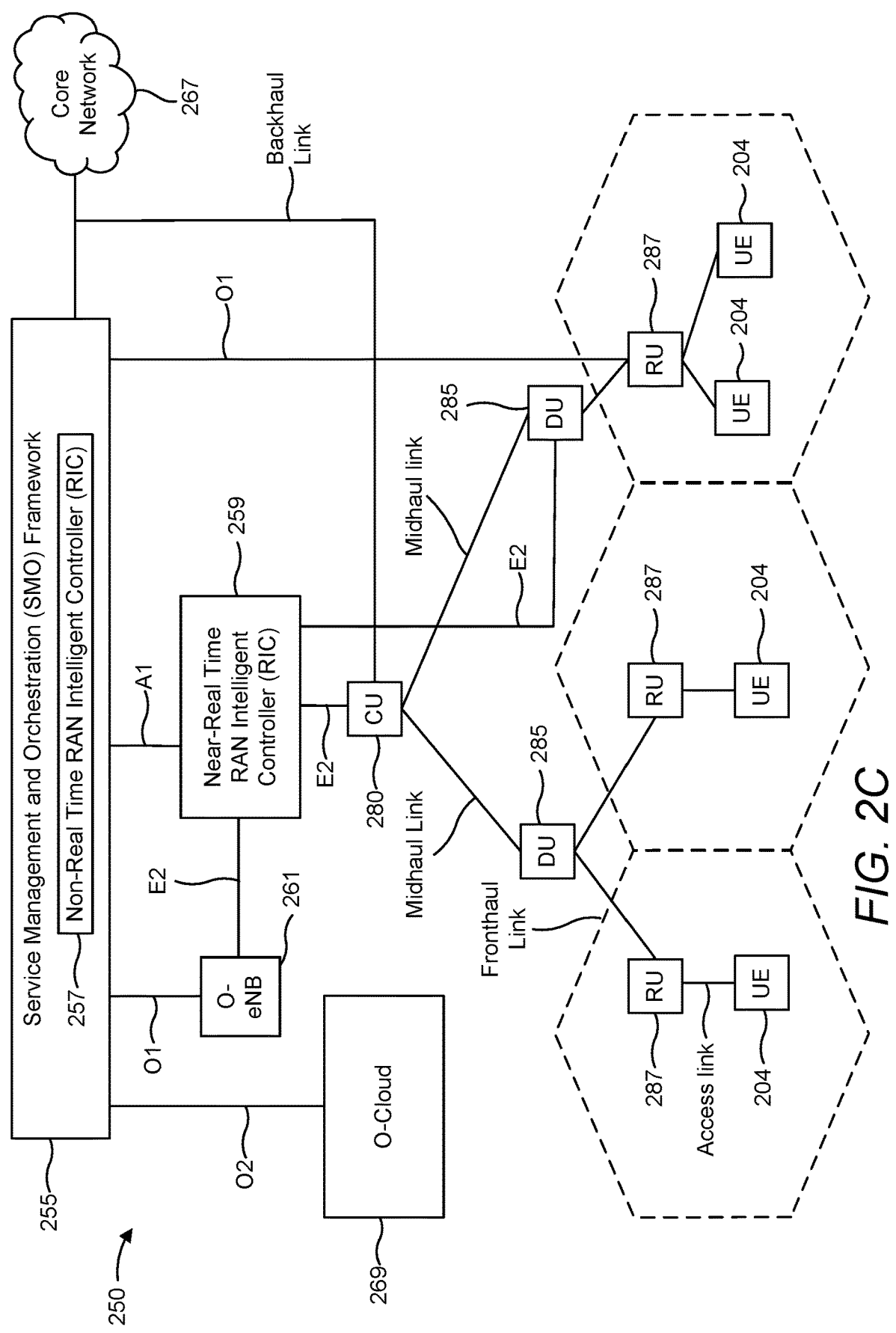

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
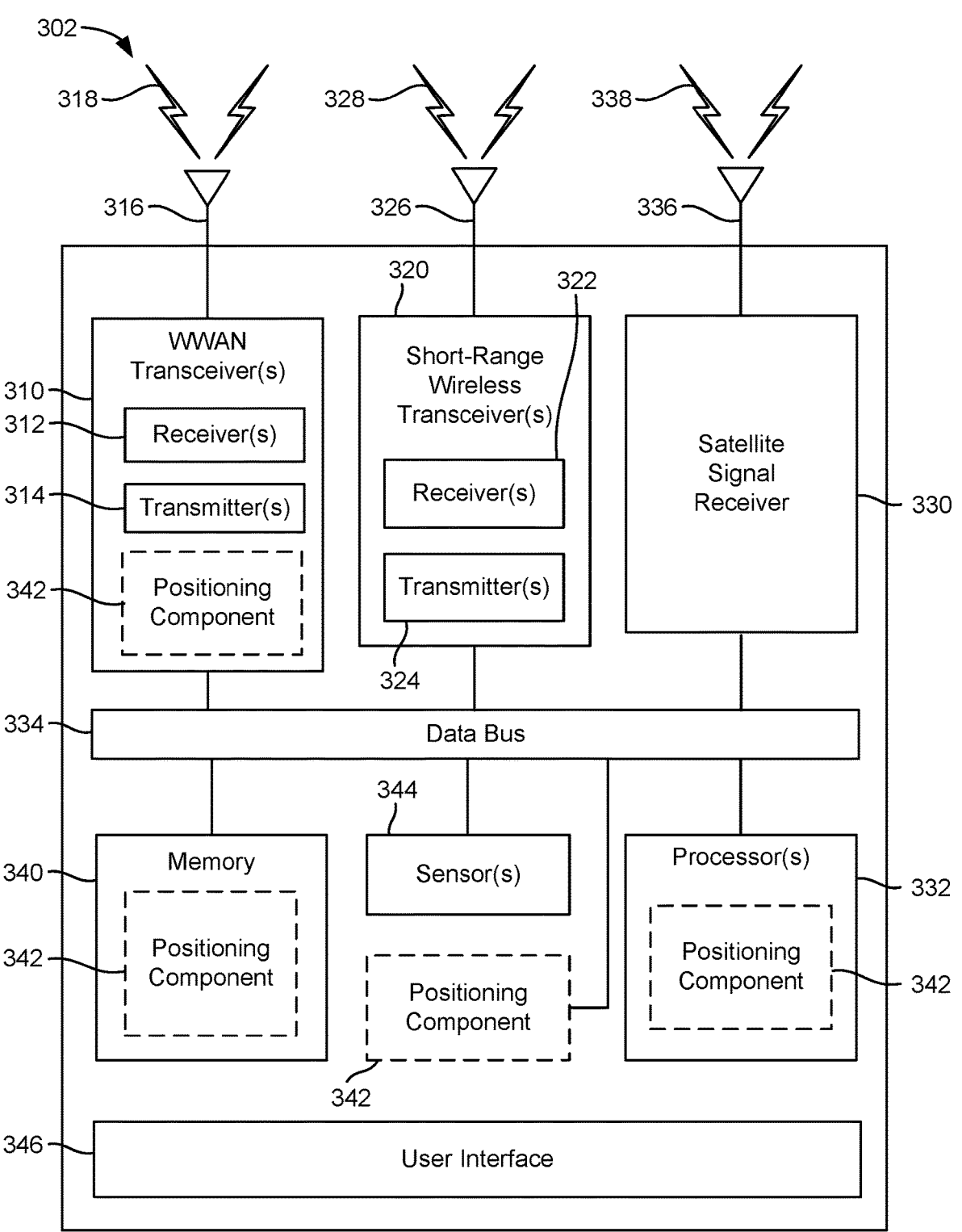
FIGS. 3A, 3B, and 3C are simplified block diagrams of several sample aspects of components that may be employed in a user equipment (UE), a base station, and a network entity, respectively, and configured to support communications as taught herein.
Figure 3B:
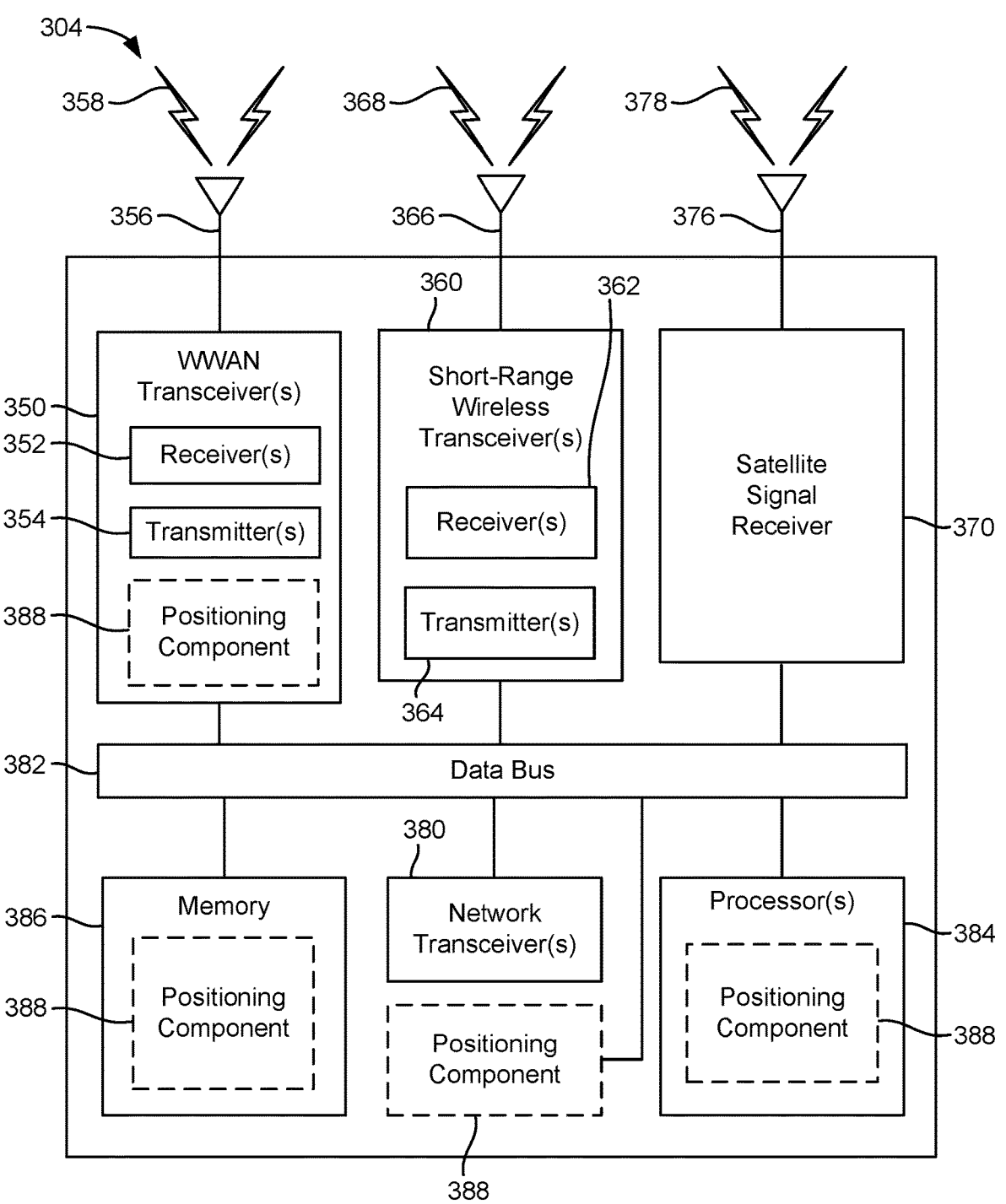
Figure 3C:
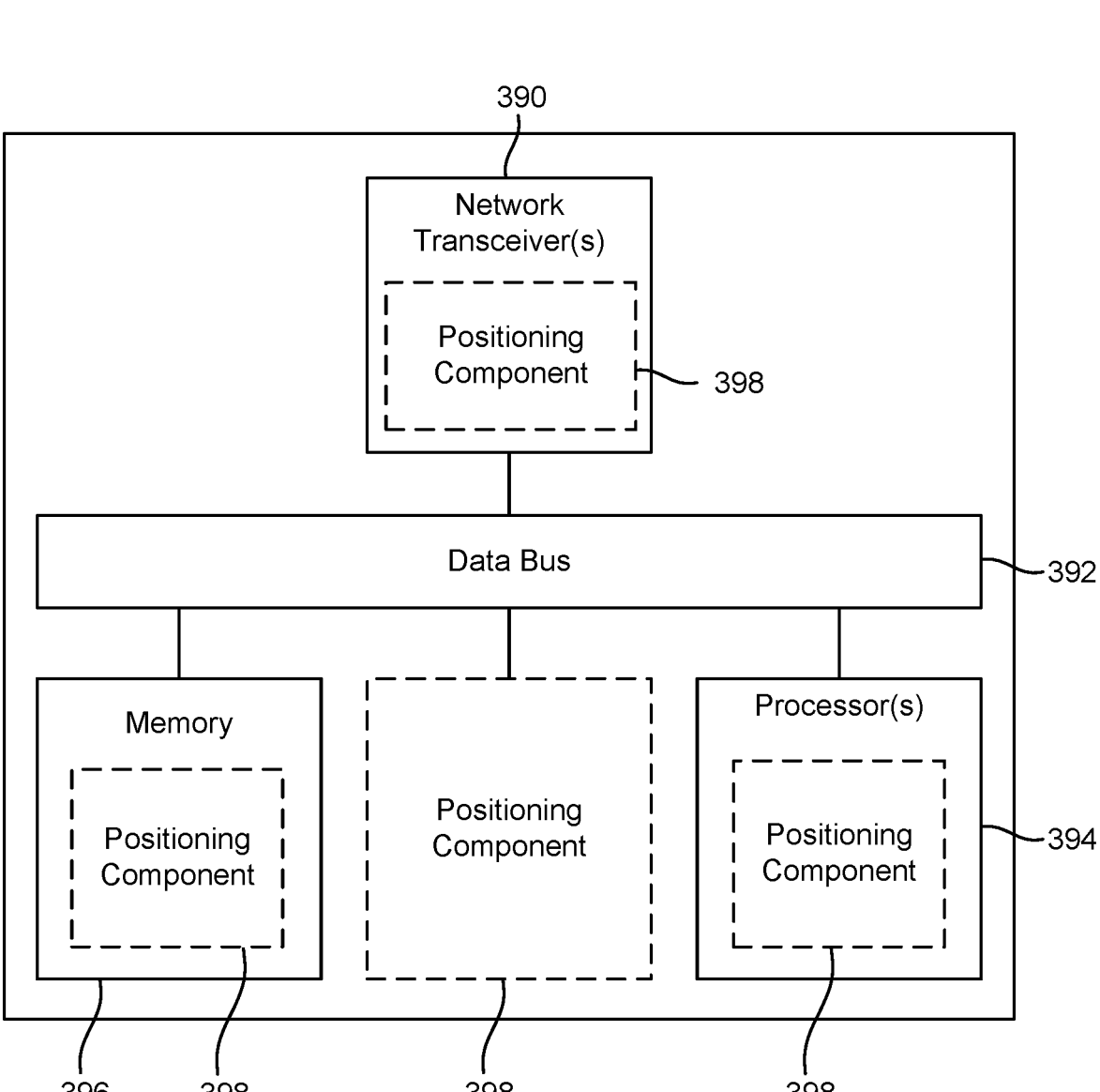

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

After a random access procedure, the UE is in an RRC CONNECTED state. The RRC protocol is used on the air interface between a UE and a base station. The major functions of the RRC protocol include connection establishment and release functions, broadcast of system information, radio bearer establishment, reconfiguration, and release, RRC connection mobility procedures, paging notification and release, and outer loop power control. In LTE, a UE may be in one of two RRC states (CONNECTED or IDLE), but in NR, a UE may be in one of three RRC states (CONNECTED, IDLE, or INACTIVE). The different RRC states have different radio resources associated with them that the UE can use when it is in a given state. Note that the different RRC states are often capitalized, as above; however, this is not necessary, and these states can also be written in lowercase.

Figure 4:
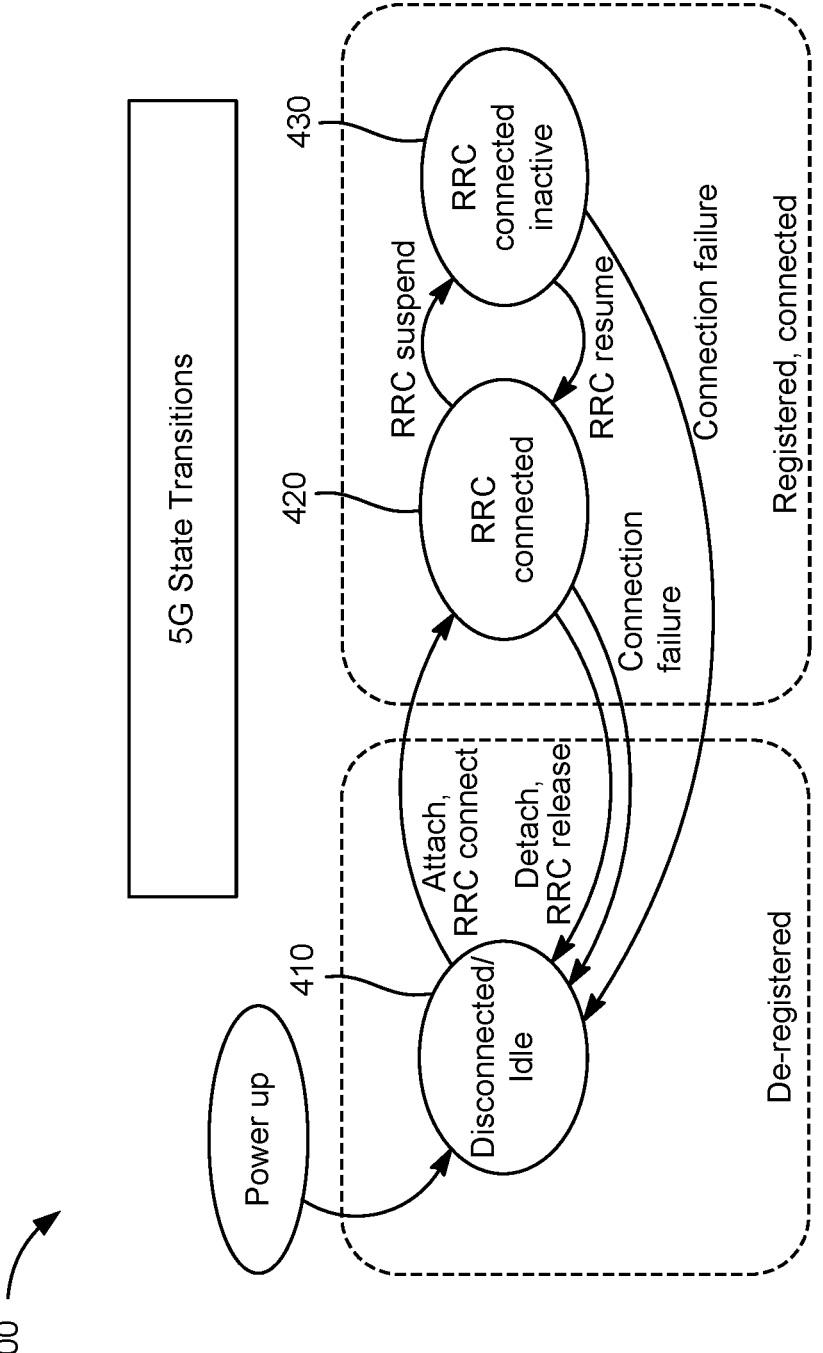
FIG. 4 illustrates the different radio resource control (RRC) states available in New Radio (NR), according to aspects of the disclosure.

FIG. 4 is a diagram 400 of the different RRC states (also referred to as RRC modes) available in NR, according to aspects of the disclosure. When a UE is powered up, it is initially in the RRC DISCONNECTED/IDLE state 410. After a random access procedure, it moves to the RRC CONNECTED state 420. If there is no activity at the UE for a short time, it can suspend its session by moving to the RRC INACTIVE state 430. The UE can resume its session by performing a random access procedure to transition back to the RRC CONNECTED state 420. Thus, the UE needs to perform a random access procedure to transition to the RRC CONNECTED state 420, regardless of whether the UE is in the RRC IDLE state 410 or the RRC INACTIVE state 430.

The operations performed in the RRC IDLE state 410 include public land mobile network (PLMN) selection, broadcast of system information, cell re-selection mobility, paging for mobile terminated data (initiated and managed by the 5GC), discontinuous reception (DRX) for core network paging (configured by non-access stratum (NAS)). The operations performed in the RRC CONNECTED state 420 include 5GC (e.g., 5GC 260) and NG-RAN (e.g., NG-RAN 220) connection establishment (both control and user planes), UE context storage at the NG-RAN and the UE, NG-RAN knowledge of the cell to which the UE belongs, transfer of unicast data to/from the UE, and network controlled mobility. The operations performed in the RRC INACTIVE state 430 include the broadcast of system information, cell re-selection for mobility, paging (initiated by the NG-RAN), RAN-based notification area (RNA) management (by the NG-RAN), DRX for RAN paging (configured by the NG-RAN), 5GC and NG-RAN connection establishment for the UE (both control and user planes), storage of the UE context in the NG-RAN and the UE, and NG-RAN knowledge of the RNA to which the UE belongs.

Figure 5:
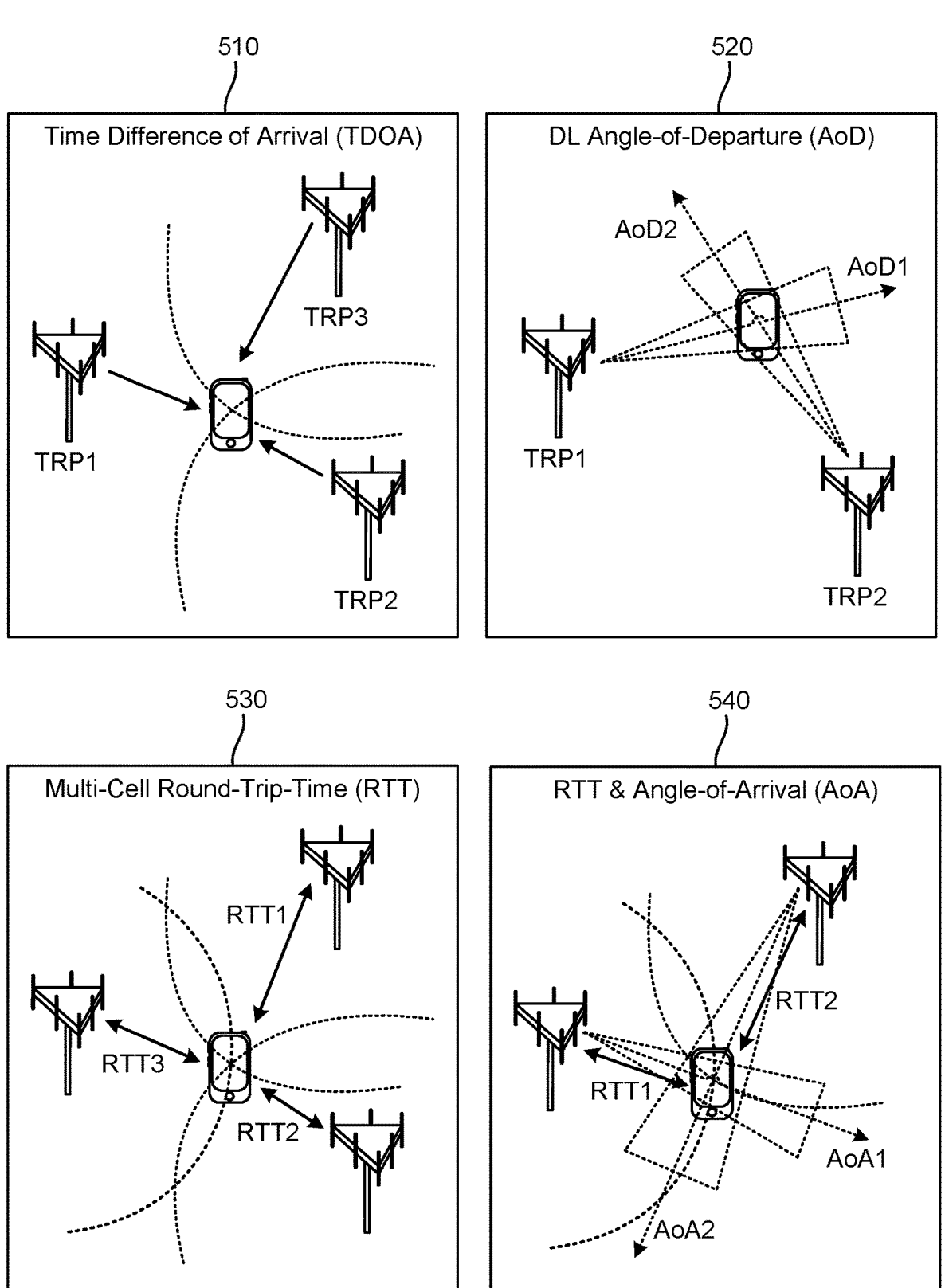
FIG. 5 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 5 illustrates examples of various positioning methods, according to aspects of the disclosure. In an OTDOA or DL-TDOA positioning procedure, illustrated by scenario 510, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 520, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 530, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 540.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
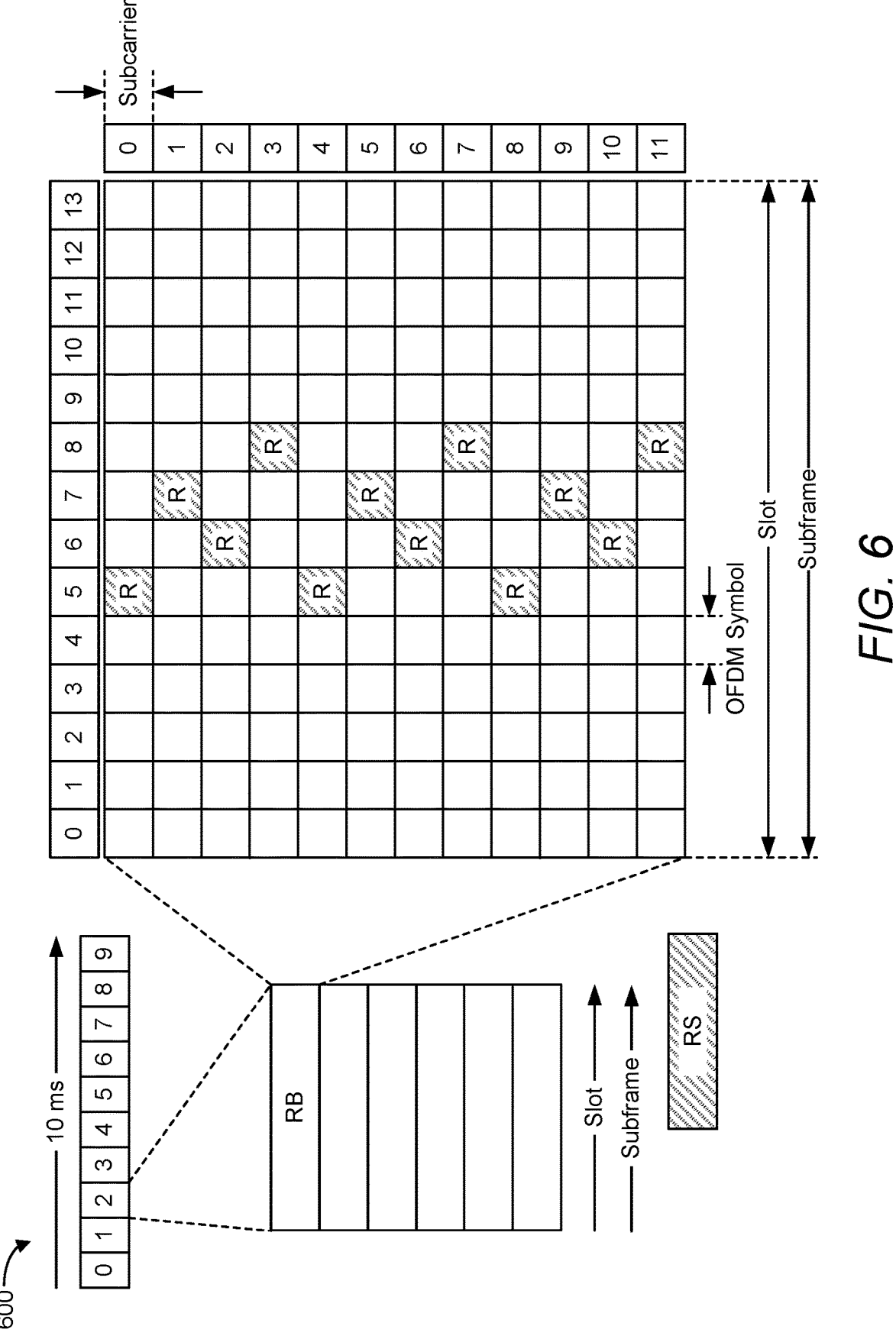
FIG. 6 is a diagram illustrating an example frame structure, according to aspects of the disclosure.

Various frame structures may be used to support downlink and uplink transmissions between network nodes (e.g., base stations and UEs). FIG. 6 is a diagram 600 illustrating an example frame structure, according to aspects of the disclosure. The frame structure may be a downlink or uplink frame structure. Other wireless communications technologies may have different frame structures and/or different channels.

LTE, and in some cases NR, utilizes orthogonal frequency-division multiplexing (OFDM) on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal fast Fourier transform (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHZ, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHZ) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 6, a numerology of 15 kHz is used. Thus, in the time domain, a 10 ms frame is divided into 10 equally sized subframes of 1 ms each, and each subframe includes one time slot. In FIG. 6, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 6, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 6 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 6 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1};

12-symbol comb-2: {0, 1, 0, 1, 0, 1, 0, 1, 0, 1, 0, 1}; 4-symbol comb-4: {0, 2, 1, 3} (as in the example of FIG. 6); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^{\mu} * \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

In an aspect, the reference signal carried on the REs labeled "R" in FIG. 6 may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 6, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 6); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or downlink control information (DCI)).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink, uplink, or sidelink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in the downlink, uplink, and/or sidelink (e.g., DMRS), the signals may be prepended with "DL," "UL," or "SL" to distinguish the direction. For example, "UL-DMRS" is different from "DL-DMRS."

Low-power high-accuracy positioning (LPHAP) techniques have been introduced that permit a UE to perform positioning operations while in the RRC INACTIVE state (RRC INACTIVE state 430). With the small data transmission (SDT) feature, a UE can also transmit data and/or NAS signaling while remaining in the RRC INACTIVE state, thereby allowing the UE to engage in downlink-and-uplink-based and/or uplink-based positioning procedures instead of just downlink-based positioning procedures.

Deferred mobile-terminated location request (MT-LR) procedures provide an efficient means for location tracking of mobile devices or assets. In an initialization phase, the target device (e.g., a UE) can be provided with positioning instructions (e.g., positioning method(s) to use, QoS, etc.) and possibly assistance data. The target device then monitors for the event occurrence, performs location measurements when an event is detected, and provides the location results to the network. Multiple event types can be supported, such as entering, leaving, or remaining within a pre-defined geographical area, movement by more than some predefined distance from a previous location, or periodic location. Procedures have been defined to allow a UE to remain in RRC INACTIVE state during the positioning measurement and event reporting phases.

Figure 7A:
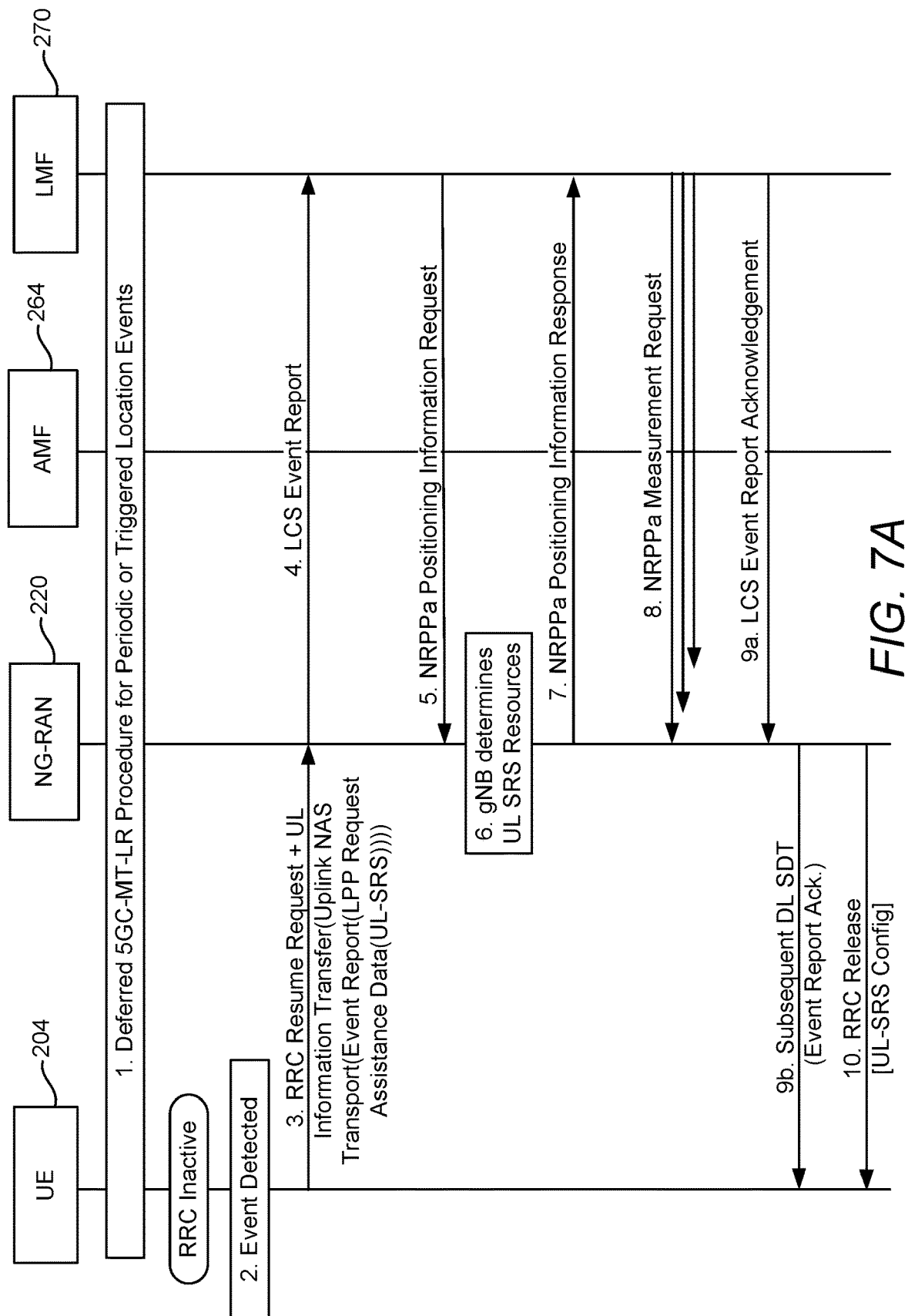
FIGS. 7A and 7B illustrate an example deferred mobile-terminated location request (MT-LR) procedure for a downlink-and-uplink-based positioning method, according to aspects of the disclosure.
Figure 7B:
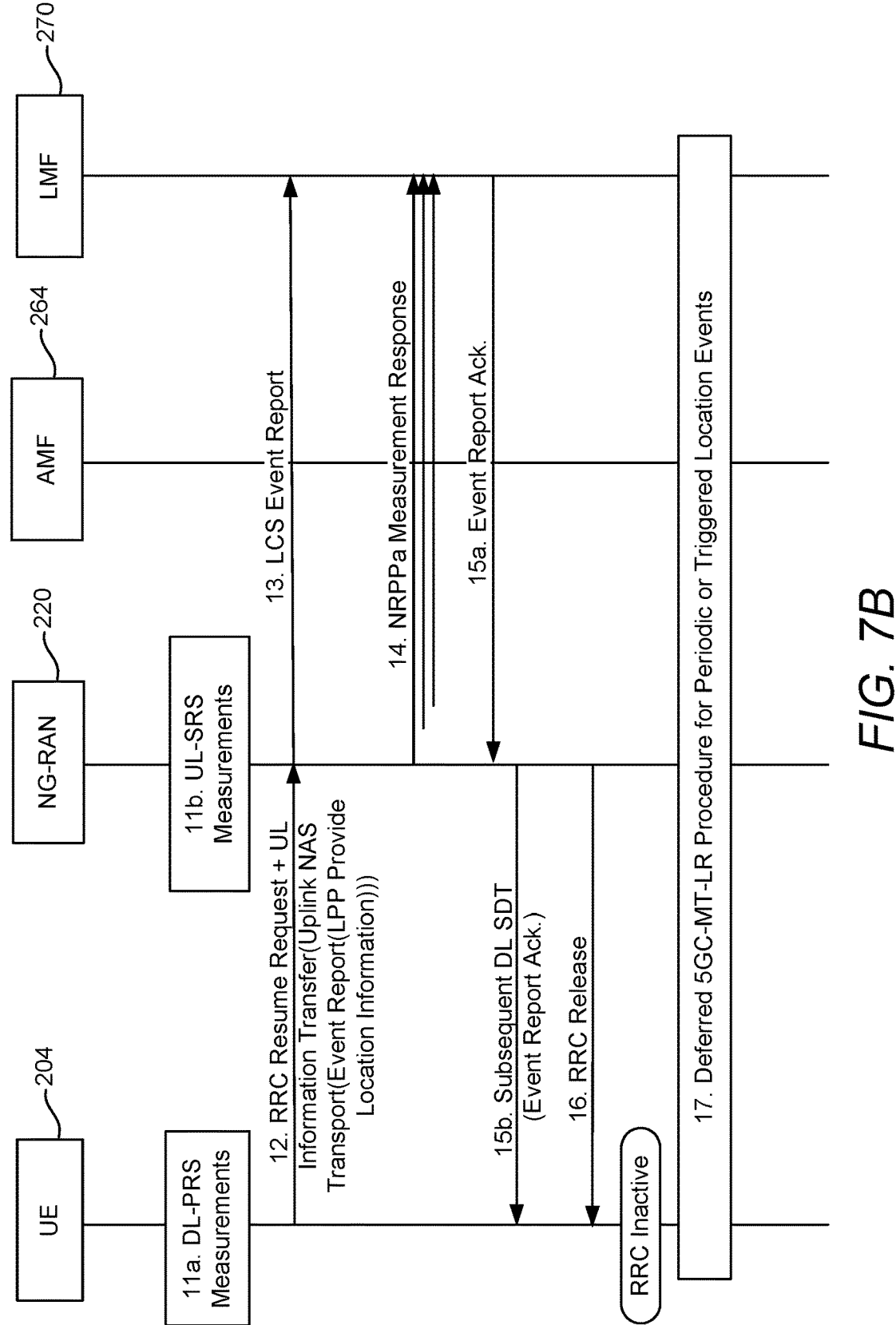

FIGS. 7A and 7B illustrate an example deferred mobile-terminated location request (MT-LR) procedure for a downlink-and-uplink-based positioning method (e.g., multi-RTT), according to aspects of the disclosure. This procedure consists of two event reports: Event Report #1 for requesting/configuring SRS for positioning (stages 3-10), illustrated in FIG. 7A, and an Event Report #2 for reporting the location measurements (stages 12-16), illustrated in FIG. 7B.

At stage 1, stages 1-21 for the deferred 5GC-MT-LR procedure for periodic or triggered location events specified in 3GPP Technical Specification (TS) 23.273, clause 6.3.1 (which is publicly available and incorporated herein by reference in its entirety) are performed. The LMF 270 may perform one or more positioning procedures at stage 15 (of the deferred 5GC-MT-LR procedure for periodic or triggered location events specified in 3GPP TS 23.273, clause 6.3.1) of the deferred 5GC-MT-LR procedure for periodic or triggered location events to request and obtain the UE 204 positioning capabilities or provide any necessary assistance data to the target device. The location services (LCS) Periodic-Triggered Location Invoke at stage 16 (of the deferred 5GC-MT-LR procedure for periodic or triggered location events specified in 3GPP TS 23.273, clause 6.3.1) of the deferred 5GC-MT-LR procedure for periodic or triggered location events includes an embedded LPP Request Location Information message that indicates the allowed or required multi-RTT location measurements for each location event reported.

At some point, the UE 204 is released by the last serving gNB from RRC CONNECTED to RRC INACTIVE by an "RRCRelease" with "SuspendConfig."

At stage 2, the UE 204 monitors for an occurrence of the trigger or periodic event requested during stage 1.

At stage 3, when an event is detected (or slightly before), the UE 204 sends an RRC UL Information Transfer message containing an UL NAS Transport message along with the RRC Resume Request via small data transmission (SDT). The UE 204 includes an LCS Event Report in the payload container of the UL NAS Transport message, and the Deferred Routing Identifier received during stage 1 in the Additional Information of the UL NAS Transport message. The LCS Event Report includes an embedded LPP Request Assistance Data message with IE "NR-Multi-RTT-RequestAssistanceData" and "nr-AdType" set to "ul-srs" to request an UL-SRS for Multi-RTT positioning. Note that the receiving gNB of the UE 204 when the UE 204 performs stage 3 might be the same or different from the last serving gNB where the UE 204 is released to the RRC INACTIVE state.

At stage 4, the receiving gNB sends the LCS Event Report with the LPP Request Assistance Data message in a Next Generation Application Protocol (NGAP) Uplink NAS Transport message to the serving AMF 264. The AMF 264 determines the LMF 270 from the Deferred Routing Identifier received in the Additional Information IE of the UL NAS TRANSPORT message and forwards the LCS Event Report with embedded LPP message via triggering Namf_Communication_NIMessageNotify service operation towards the LMF 270. The AMF 264 also includes the Payload Container Type and the Correlation Identifier set to the Deferred Routing Identifier. Note that if the anchor gNB is not changed from the last serving gNB to the receiving gNB, the LCS event report may be forwarded from the receiving gNB to the last serving gNB via Xn Application Protocol (XnAP) message RRC TRANSFER. Subsequent downlink/uplink messages may also be forwarded between last serving gNB to the receiving gNB via XnAP message RRC TRANSFER.

At stage 5, the LMF 270 sends a New Radio positioning protocol type A (NRPPa) Positioning Information Request message to the receiving gNB to request UL-SRS for the target device (i.e., UE 204).

At stage 6, the receiving gNB determines the resources available for UL-SRS.

At stage 7, the receiving gNB provides the UL-SRS configuration information to the LMF 270 in an NRPPa Positioning Information Response message.

At stage 8, the LMF 270 sends a NRPPa Measurement Request to a group of gNBs including the UL-SRS measurement configuration.

At stage 9, the LMF 270 sends a Supplementary Services (SS) LCS Event Report Acknowledgement to the receiving gNB. The receiving gNB then provides the SS Event Report Acknowledgement to the UE 204 at stage 9b via a Subsequent DL SDT.

At stage 10, the receiving gNB sends an "RRCRelease" message with "suspendConfig" to keep the UE 204 in RRC INACTIVE state. The "RRCRelease" message includes the UL-SRS configuration.

At stage 11, the UE 204 performs DL-PRS measurements and each configured TRP performs UL-SRS measurements.

At stage 12, the UE 204 sends an RRC UL Information Transfer message containing an UL NAS Transport message along with the RRC Resume Request via SDT. The UE 204 includes the LCS Event Report and LPP Provide Location Information message in the payload container of the UL NAS Transport message, and the Deferred Routing Identifier received during stage 1 in the Additional Information of the UL NAS Transport message.

At stage 13, the receiving gNB sends the LCS Event Report with the LPP Provide Location Information message in an NGAP Uplink NAS Transport message to the serving AMF 264. The AMF 264 determines the LMF 270 from the Deferred Routing Identifier received in the Additional Information IE of the UL NAS TRANSPORT message and forwards the LCS Event Report with embedded LPP message via triggering Namf_Communication_NIMessageNotify service operation towards the LMF 270. The AMF 264 also includes the Payload Container Type and the Correlation Identifier set to the Deferred Routing Identifier.

At stage 14, after performing the UL-SRS measurements, the gNBs provide the UL measurements to the LMF 270 in a NRPPa Measurement Response message.

At stage 15, when all LPP Provide Location Information messages have been received, the LMF 270 sends an SS LCS Event Report Acknowledgement to the receiving gNB. The receiving gNB then provides the SS Event Report Acknowledgement to the UE 204 at stage 15b via a Subsequent DL SDT.

At stage 16, the receiving gNB sends an "RRCRelease" message with "suspendConfig" to keep the UE 204 in RRC INACTIVE state.

At stage 17, stages 28-31 for the deferred 5GC-MT-LR procedure for periodic or triggered location events specified in TS 23.273, clause 6.3.1 are performed.

In the foregoing procedure, each time an event report is triggered (e.g., when a periodic timer expires), a new positioning SRS may be "negotiated" between the LMF and the serving/receiving gNB (as at stages 3-10 in FIG. 7A). This results in large signaling activities for, for example, periodic events with relatively small periodicities (e.g., 15-30 seconds), and therefore, additional latency and processing, which may also adversely affect power consumption at the target device.

To reduce the amount of SRS configuration signaling, preconfigured positioning SRS has been proposed. This assumes that a positioning SRS can be provided once, for example, at the initialization phase of the deferred MT-LR procedure (stage 1 in FIG. 7A), which could then be activated when needed. Instead of sending an Event Report to an LMF 270 at stages 3 and 4 in FIG. 7A to request a positioning SRS from an LMF 270, the UE 204 could send a request to activate a pre-configured positioning SRS directly to the NG-RAN 220 (receiving gNB), potentially using lower layer signaling (e.g., MAC control element (CE) (MAC-CE)). In that case, stage 5-7 and 9a in FIG. 7A would not be needed or could be simplified.

However, due to mobility, a UE may request "SRS activation" in a cell different from the cell from which the preconfigured positioning SRS has been received. SRS for positioning is, in general, UE and location specific. The positioning SRS configuration is currently only valid in the cell where the UE has received the SRS configuration. This is due to the fact that the SRS configuration includes parameters that are (at least roughly) UE location dependent, such as spatial relation information and pathloss reference information (both are provided for neighbor cells and the neighbor cells are typically different for different serving cells), and information determined by the receiving/serving gNB, such as timing advance information. Currently, a UE would release the positioning SRS configuration when a cell reselection occurs. However, since a positioning SRS configuration also includes parameters that could be valid for larger parts of a network (multiple cells), at least parts of the SRS configuration could be preconfigured.

To enable pre-configuration of positioning SRS, the positioning SRS parameters can be divided into two parts. The first part, referred to as "Part (a)," is a set of parameters that are valid for multiple cells. The area where this set of parameters is valid may be indicated by a list of cell IDs. This list of cell IDs may be considered as an "Area ID" where the set of positioning SRS parameters are applicable or valid. The second part, referred to as "Part (b)," is a set of parameters that are location/cell specific. Part (a) of the SRS for positioning configuration can be preconfigured, while Part (b) would be provided in the SRS activation message.

FIG. 8 is a diagram 800 illustrating a preconfigured positioning SRS structure, according to aspects of the disclosure. As shown in FIG. 8, each preconfigured positioning SRS includes an Identifier.

A positioning SRS configuration for RRC INACTIVE state currently includes the following parameters, as specified in 3GPP TS 38.331 (which is publicly available and incorporated herein by reference in its entirety). An "SRS-PosResourceSet" includes "srs-PosResourceSetId," "srs-PosResourceIdList," "resourceType," "alpha," "p0," and "pathlossReferenceRS-Pos" parameters. The "srs-PosResourceSetId" parameter indicates the ID of this resource set. It is unique in the context of the BWP in which the positioning SRS is defined. The "srs-PosResourceIdList" parameter indicates the IDs of the SRS for positioning resources used in this "SRS-PosResourceSet." The "resourceType" parameter defines the time domain behavior of the SRS resource configuration (e.g., periodic, semi-persistent, aperiodic). The "alpha" parameter indicates the value for the positioning SRS power control, defining the fractional pathloss compensation. The alpha value is multiplied by the UE with the pathloss estimate. For full pathloss compensation, alpha is equal to 1. The "p0" parameter indicates the value for the positioning SRS power control, which can be described as the "desired receive power" at the TRP. That is, the SRS for positioning transmit power determination is based on p0+alpha×PL, where PL is the pathloss estimate. The "pathlossReferenceRS-Pos" parameter defines the reference DL signal to be used for pathloss estimation. The downlink reference signal can be an SSB or DL-PRS from the serving or neighboring TRP.

An "SRS-PosResource" includes "srs-PosResourceId," "transmissionComb," "resourceMapping," "freqDomainShift," "freqHopping," "groupOrSequenceHopping," "resourceType," "sequenceId," and "spatialRelationInfo-Pos" parameters. The "srs-PosResourceId" parameter indicates an SRS for positioning Resource Identity defining the particular positioning SRS Resource. The "transmissionComb" parameters defines the comb size N of the positioning SRS (e.g., N=2, 4, or 8), the comb offset of the first symbol of the positioning SRS Resource (0 . . . . N−1), and the cyclic shift for generating the reference sequence. The "resourceMapping" (which includes "startPosition" and "nrofSymbols") defines the first OFDM symbol location of the positioning SRS Resource in a slot (e.g., 0, 1, 2, . . . , 13) and the number of symbols of the positioning SRS Resource (e.g., 1, 2, 4, 8, or 12). The "freqDomainShift" parameter defines the frequency domain position of the positioning SRS Resource. The "freqHopping" parameter (or "c-SRS") defines the bandwidth of the positioning SRS Resource. The "groupOrSequenceHopping" parameter defines whether group or sequence hopping is used. The hopping modes are used to randomize the reuse of a sequence in the system. The "resourceType" parameter defines the positioning SRS Resource type (periodic, semi-persistent, aperiodic) and the periodicity for semi-persistent and periodic positioning SRS. The "sequenceId" parameter defines the sequence ID used to initialize the pseudo-random group and sequence hopping. The "spatialRelationInfoPos" parameter defines the spatial relation between a reference signal and the target SRS. The reference signal can be an SSB, CSI-RS, DL-PRS, or SRS.

Additional parameters include the BWP information, which defines the BWP configuration for the SRS for Positioning, including the frequency domain location and bandwidth of this bandwidth part, subcarrier spacing, and cyclic prefix. An "inactivePosSRS-TimeAlignmentTimer" parameter indicates a timer value for SRS for positioning transmission. An "inactivePosSRS-RSRP-changeThreshold" parameter indicates the RSRP threshold for the increase/decrease of RSRP for time alignment validation.

A possible set of Part (a) parameters that may be valid for multiple cells may include: "SRS-PosResourceSet, "srs-PosResourceSetId," "srs-PosResourceIdList," "resourceType," "SRS-PosResource," "srs-PosResourceId," "transmissionComb," "resourceMapping" ("startPosition," "nrofSymbols"), "freqDomainShift," "freqHopping" ("c-SRS"), "groupOrSequenceHopping," "resourceType," and "sequenceId." A possible set of Part (b) parameters valid for a single (serving/receiving) cell may include: "alpha," "p0," "pathlossReferenceRS-Pos," "spatialRelationInfoPos," BWP information, the time alignment timer (e.g., timing advance timer), and the RSRP change threshold. However, an implementation/deployment is free to divide the SRS for positioning parameters into the two sets (Part (a) and Part (b)) as desired. In a special case, all parameters may qualify for "Part (a)" SRS, for example, when no pathloss reference, or spatial relation, etc. is needed.

The pre-configuration would include the Part (a) parameter set. The remaining parameters (Part (b)) would be provided during the SRS activation procedure. The procedure shown in FIGS. 7A and 7B could then be modified as shown in FIGS. 9A and 9B.

Figure 9A:
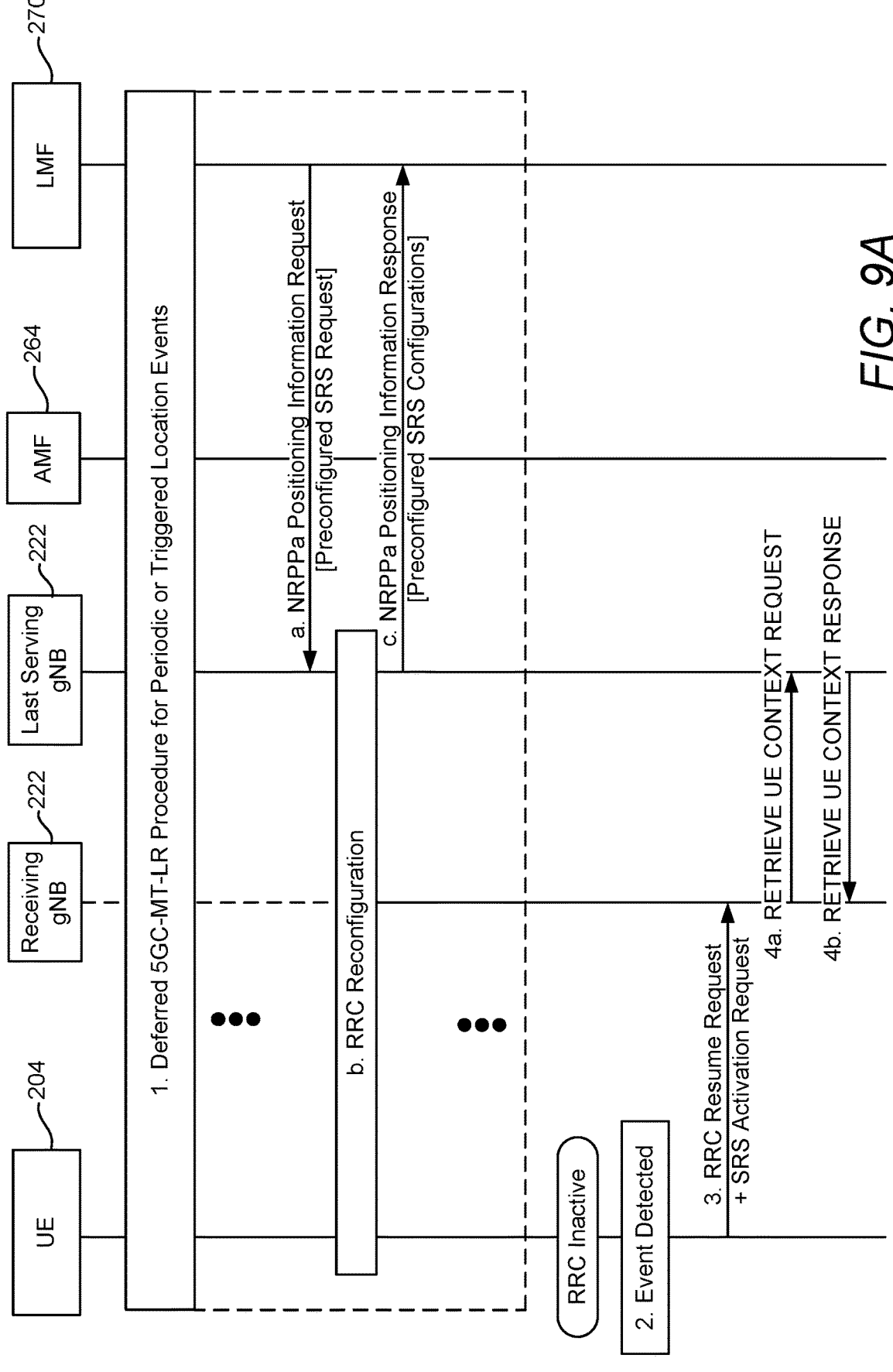
FIGS. 9A and 9B illustrate an example deferred MT-LR procedure for a downlink-and-uplink-based positioning method with positioning SRS pre-configuration, according to aspects of the disclosure.
Figure 9B:
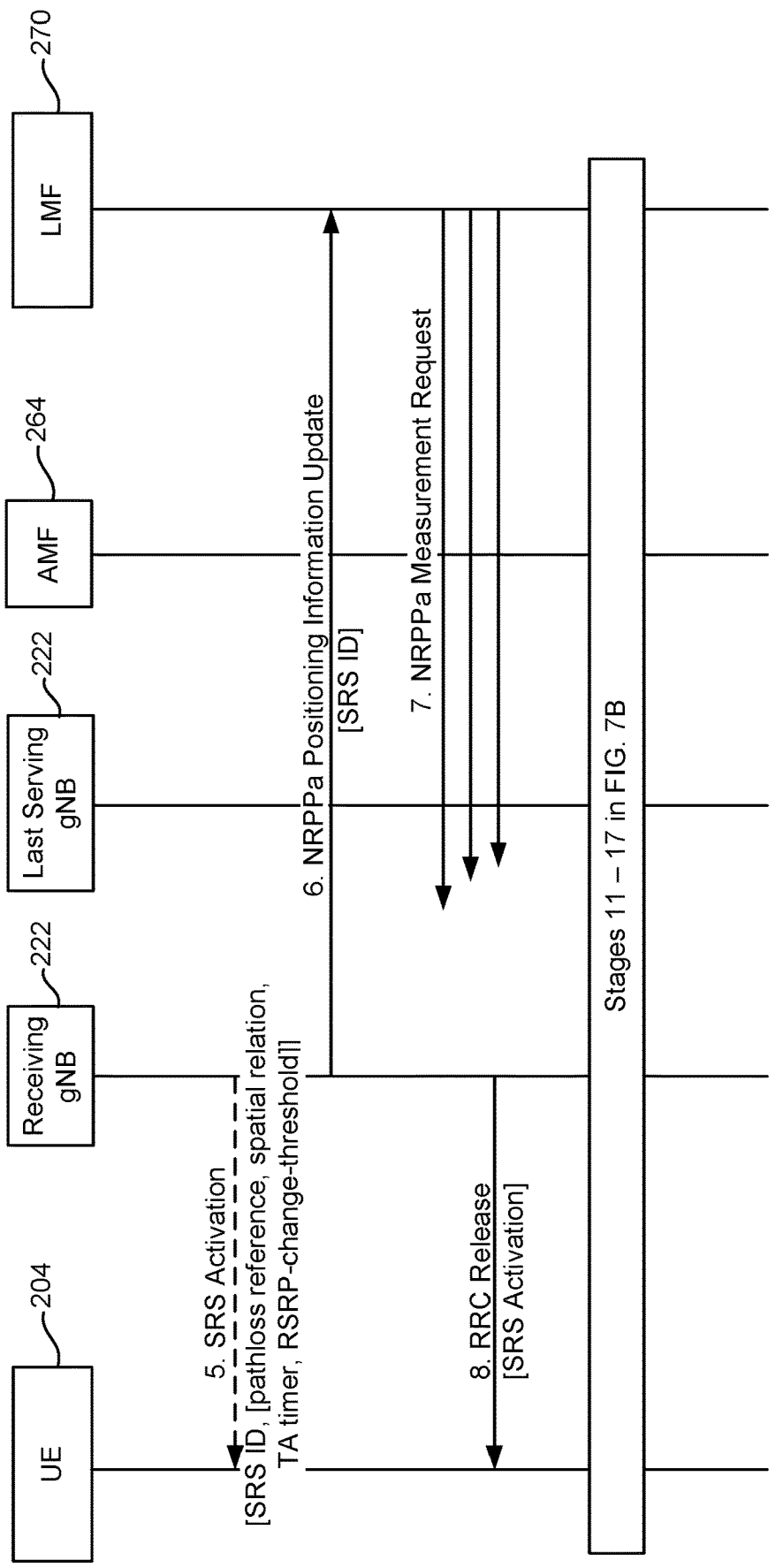

FIGS. 9A and 9B illustrate an example deferred MT-LR procedure for a downlink-and-uplink-based positioning method (e.g., multi-RTT) with positioning SRS pre-configuration, according to aspects of the disclosure. At stage 1, stages 1-21 of the deferred 5GC-MT-LR procedure for periodic or triggered location events specified in 3GPP TS 23.273, clause 6.3.1 are performed. Stages 1a, 1b, and 1c may be performed during the deferred MT-LR configuration phase of the deferred 5GC-MT-LR procedure for periodic or triggered location events (e.g., during stage 15 of the deferred 5GC-MT-LR procedure for periodic or triggered location events specified in 3GPP TS 23.273, clause 6.3.1).

At stage 1a, the LMF 270 sends an NRPPa Positioning Information Request message to the serving gNB 222 including a request for preconfigured positioning SRS. The request may include one or more "Requested SRS Transmission Characteristics" IEs, each defining a desired positioning SRS configuration. The LMF 270 may include for each gNB in an area the pathloss reference, spatial relation, and SSB information. This "assistance information" may be used by a serving/receiving gNB 222 to compile the Part (b) parameters valid for the current UE location at a later time. For example, for each considered Cell-ID, the assistance information may include a neighbor cell list with SSB or DL-PRS information that can be used as pathloss reference(s) or spatial relation(s) for the positioning SRS.

At stage 1b, the serving gNB 222 determines one or more positioning SRS configurations and provides these configurations to the target device (UE 204) for transmission of positioning SRS by the target device at a later time (i.e., the target device does not transmit any positioning SRS when pre-configured). Each positioning SRS configuration has an associated identifier, as illustrated in FIG. 8. Each positioning SRS may have a validity time and/or a validity area. The "validity area" may be defined by a list of Cell-IDs defining where this SRS configuration is applicable/valid.

At stage 1c, the serving gNB 222 provides the set of preconfigured positioning SRS to the LMF 270 (e.g., one or more "SRS Configuration" IEs, where each positioning SRS has an associated ID as illustrated in FIG. 8).

At stage 3, after (or slightly before) an event is detected, the UE 204 sends an SRS Activation Request message along with the RRC Resume Request to the receiving gNB 222. The SRS Activation Request message may include the identifiers of a desired preconfigured SRS configuration (e.g., in priority order) to be activated.

At stage 4, the receiving gNB 222 identifies the last serving gNB 222 using the inactive radio network temporary identifier (I-RNTI) and retrieves the UE context (including the preconfigured positioning SRS information) by means of an Xn-AP Retrieve UE Context procedure. The receiving gNB 222 determines the positioning SRS configuration based on the pre-configuration during stage 1. The receiving gNB 222 may determine the Part (b) parameters, such as the pathloss reference information (e.g., "alpha," "p0," "pathlossReferenceRS-Pos") or spatial relation information (e.g., "spatialRelationInfoPos") for the positioning SRS valid for the receiving gNB 222. The receiving gNB 222 may also determine the time alignment timer and RSRP change threshold (e.g., "inactivePosSRS-TimeAlignmentTimer," "inactivePosSRS-RSRP-change Threshold"). The receiving gNB 222 may use the assistance information received from the LMF 270 at stage 1a to determine the above SRS parameter set.

At stage 5, the receiving gNB 222 may then send an SRS Activation message to the UE 204 that includes the ID of the preconfigured SRS to be activated, and the Part (b) SRS information (e.g., pathloss reference, spatial relation, the timing advance (TA) timer, and the RSRP change threshold). The SRS Activation message may be an RRC message or a MAC-CE or a DCI. The UE 204 then starts transmitting the positioning SRS according to the activated configuration.

At stage 6, the receiving gNB 222 sends an NRPPa Positioning Information Update message to the LMF 270 including the ID of the activated positioning SRS.

At stage 7, the LMF 270 sends an NRPPa Measurement Request message to a group of gNBs/TRPs including the positioning SRS measurement configuration (i.e., based on the ID received at stage 6).

At stage 8, the receiving gNB 222 sends an RRC Release message to the UE 204 to release the UE 204 to RRC INACTIVE state. If stage 5 did not occur, the RRC Release message includes the SRS Activation message. The various network entities then perform stages 11-17 illustrated in FIG. 7B.

Compared to the procedure illustrated in FIGS. 7A and 7B, the signaling for SRS configuration (stages 5, 6, 7, and 9) would not be needed, reducing the latency of the SRS configuration, and thereby power consumption (i.e., the UE "awake time" between stages 3 and 10 in FIG. 7A is reduced).

Preconfigured SRS assistance data may consist of multiple preconfigured SRS configurations, where each preconfigured SRS configuration is applicable to a different SRS validity area within the network. Each preconfigured SRS configuration may be associated with an area identifier (ID). The area ID includes a list of cells on which the UE can be camped (in RRC INACTIVE state) or to which the UE can be connected (in RRC CONNECTED state). The applicable area ID at the UE location is selected based on the cell where the UE is camped/connected. A preconfigured SRS configuration is valid/selected if the UE is camped on or connected to one of the cells indicated within the list of cells in the area ID.

Figure 10:
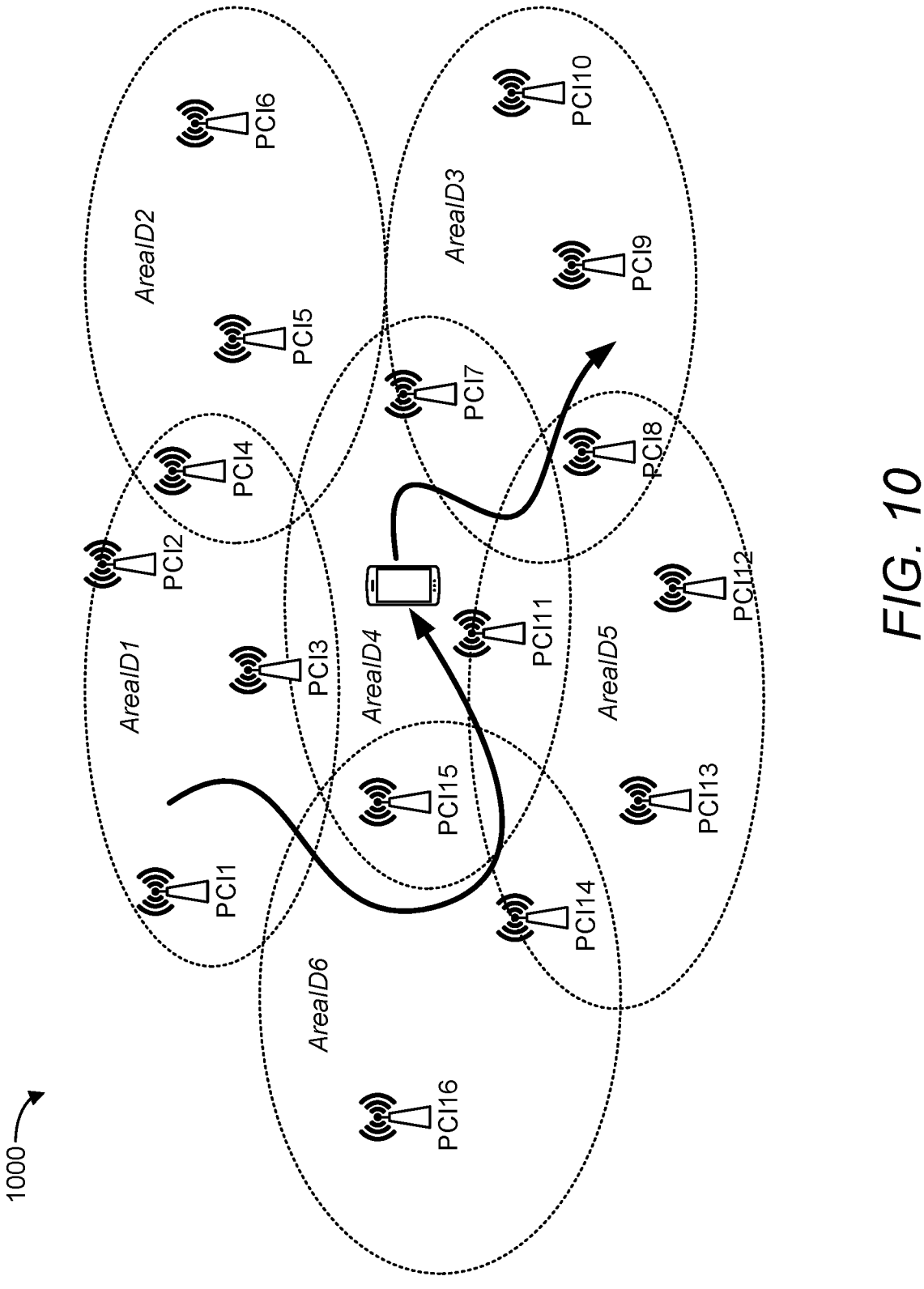
FIG. 10 is a diagram illustrating an example UE mobility scenario through multiple areas, according to aspects of the disclosure.

FIG. 10 is a diagram 1000 illustrating an example UE mobility scenario through multiple SRS validity areas, according to aspects of the disclosure. There are six area IDs (labeled "AreaID1" to "AreaID6") in the example of FIG. 10, each including multiple cells (labeled "PCI1" to "PCI16"). Note that while FIG. 10 illustrates a single cell/PCI per physical cell site, this is for simplicity, and as will be appreciated, a cell site may support multiple cells. Further, in the example of FIG. 10, certain cells may belong to more than one area ID. For example, PCI4 may belongs to both AreaID1 and AreaID2. Similarly, PCI7 may belong to both AreaID3 and AreaID4.

For an SRS configuration, with reference to FIG. 10, the UE may be configured with a preconfigured SRS configuration for each of AreaID1 to AreaID6. Since the UE is currently located in AreaID4, the preconfigured SRS configuration associated with AreaID4 is valid/selected if the UE is camped on or connected to one of the cells (e.g., PCI3, PCI7, PCI11, PCI15) associated with areaID4.

To enable greater network control over the transmission of positioning SRS (or SRS for positioning) after cell reselection, an LPP "Area-ID-CellList" information element (IE) has been introduced for the (pre-) configured positioning SRS. Compared to a DL-PRS assistance data validity, the "Area-ID-CellList" IE for positioning SRS would be UE-specific. If the UE camps on a cell whose ID is included in the "Area-ID-CellList" IE, the UE would be permitted to continue the (associated) positioning SRS transmission in the new cell after cell reselection. That is, if the UE is engaged in an uplink-based or downlink-and-uplink-based positioning procedure in which it transmits positioning SRS and hands over/reattaches to a different cell, then so long as that cell is included in the "Area-ID-CellList" IE, the UE can continue transmitting the same positioning SRS.

FIG. 11 illustrates an example RRC "SRS-PosRRC-Inactive" IE 1100, according to aspects of the disclosure. This IE configures the UE with one or more positioning SRS configurations to use when in the RRC INACTIVE state 430. Specifically, the "SRS-PosRRC-Inactive" IE provides a set of up to "maxPreConfig" positioning SRS configurations, where each configuration can be identified by an "srs-PosID" field. The "srs-ValidityArea" field provides a list of cell IDs where the SRS configuration is valid. If the UE reselects to a cell included in the LPP "Area-ID-CellList" IE, the UE is permitted to continue SRS transmission during and after cell reselection. Note that the "Area-ID-CellList" IE may not necessarily coincide with an RNA, but rather, could be a dedicated, UE-specific, uplink positioning area.

The RRC "SRS-PosRRC-Inactive" IE avoids interruption of SRS transmission at cell reselection, which reduces the amount of SRS configuration signalling required, reduces the latency of the positioning session, and hence power consumption at the target device.

A UE transmits SRS and other uplink transmissions according to its uplink timing. The uplink timing is simply the downlink reference timing plus an uplink timing advance (TA). The downlink reference timing (or simply "downlink timing") is defined as the time when the first detected path (in time) of the corresponding downlink frame is received from the reference cell (e.g., the UE's serving cell or the cell on which the UE is camped). The uplink TA accounts for the round-trip propagation delay between the UE and the reference cell, with UEs closer to the cell having a shorter propagation delay and therefore a smaller TA, and UEs further away from the cell having a longer propagation delay and therefore a larger TA.

The uplink TA helps to ensure that uplink transmissions from all UE are synchronized when received by the cell. A UE is configured with the uplink TA by its serving cell when in the RRC CONNECTED state (RRC CONNECTED state 420). However, when moving from cell to cell while in the RRC INACTIVE or IDLE state (collectively an "RRC non-connected" state), the uplink TA may be different for the cell on which the UE is currently camped. This can be an issue where the UE is configured to transmit SRS for positioning while in the RRC INACTIVE state, as, for example, the transmissions may not occur at the time(s) the network expects and/or may interfere with other uplink transmissions from other UEs.

In some cases, it may be feasible to configure a TA timer for a UE in RRC INACTIVE state that is specific to a positioning SRS validity area. For example, the TA timer may have a larger value when the UE is in RRC INACTIVE state than when the UE is in RRC CONNECTED state. In addition, for TA validation, it may be feasible to use an area-specific RSRP change threshold.

There are different options, referred to herein as "uplink TA derivation rules" (or "TA derivation rules" or "derivation rules" or simply "rules"), for the determination of the uplink timing for the transmission of SRS for positioning by UEs in RRC INACTIVE state within a positioning SRS validity area. As a first option, or first derivation rule, the UE can maintain the uplink TA obtained from the last serving cell within the validity area. In this case, as the UE moves, the uplink TA value should remain constant within the area. However, since the downlink timing may change, the uplink timing may change, and this change may be abrupt if the UE abruptly changes the cell used for the downlink timing determination.

As a second TA derivation rule, the UE may autonomously adjust the uplink TA. How the UE adjusts the TA may be up to UE implementation or based on the TA from the last serving cell and the downlink time difference measurement of SSBs from the last serving cell and the new camping cell. In this case, as the UE moves, the uplink timing should remain constant within the SRS validity area. However, since the downlink timing may change, the uplink TA value would also change so that the resulting summation (i.e., the uplink timing) remains the same.

As a third TA derivation rule, the UE may maintain multiple uplink TA values. In this case, the UE may perform a random-access procedure (e.g., a random-access channel (RACH) procedure) to the new cell and receive the TA value for the new cell. As the UE moves around, it should keep track of the uplink TA value associated to each cell.

As noted above, for TA validation, it may also be feasible to use an area-specific RSRP change threshold. In this case, as a UE moves, it measures the RSRPs of the SSBs broadcasted by nearby cells and compares those RSRPs to a reference RSRP. Currently, the reference RSRP is defined as the RSRP of the UE's last/most recent serving cell. However, as with the TA, the UE may become far enough removed from the last serving cell while in an RRC non-connected state (due to mobility) that continuing to use that RSRP as the reference RSRP no longer makes sense.

The present disclosure provides techniques for choosing the reference RSRP used for the area-specific SRS resource RSRP change threshold computation. The reference RSRP should be obtained from the latest cell for which the UE has determined a valid TA, where a valid TA, in the scenario of validity area-specific SRS (also referred to as multi-cell SRS or simply area-specific SRS), may be determined according to one of several cases, if the associated TA timer has not expired.

As a first case, the UE may determine that the downlink reference time has changed, and the UE may autonomously adjust the previous valid TA such that the uplink timing remains the same. Here, "remains the same" means within a given threshold/maximum tolerance. That is, the uplink timing may change (adjust) over time, so long as it changes (adjusts) less than a threshold/maximum tolerance (i.e., gradually). The threshold/maximum tolerance may be configured to the UE together with the area-specific RSRP change threshold or it may be specified in the UE requirements (e.g., it may be dependent on the SCS, the numerology, the frequency range (e.g., FR1, FR2), the frequency band, the signal-to-noise ratio (SNR), and/or the RSRP level).

A TA autonomous adjustment may only be performed if the downlink reference time has been determined to have changed by more than a given threshold or every time a new camping cell (i.e., the cell on which the UE is camped in an RRC non-connected state) is identified. This threshold may be configured to the UE together with the area-specific RSRP change threshold or it may be specified in the UE requirements (e.g., it may be dependent on the SCS, the numerology, the frequency range, the frequency band, the SNR, and/or the RSRP level)

As a second case, a new valid TA may be received through explicit signaling from the latest serving cell. This is the currently defined behavior.

As a third case, the UE may determine that the downlink reference time has changed, and the UE may determine that the new valid TA is equal to the previous valid TA. In this case, the reference RSRP does not change either. Such a determination may occur if the downlink reference time has changed by a small amount compared to a threshold. The threshold may be configured to the UE together with the area-specific RSRP change threshold or it may be specified in the UE requirements (e.g., it may be dependent on the SCS, the numerology, the frequency range, the frequency band, the SNR, and/or the RSRP level).

The foregoing cases may be expressed by the following rules/heuristics. (1) If the TA timer has expired, then the previous TA is invalid. (2) Otherwise, if the UE received a new TA value through explicit signalling from the network, this TA value is the new valid TA. (3) Otherwise, if the received downlink timing has changed (e.g., the camping cell has changed) less than a threshold, the UE maintains the same valid TA and the reference RSRP for the RSRP change computation does not change. Here, "maintains the same" means exactly the same or within a given threshold/maximum tolerance. That is, the TA may change (adjust) over time, so long as it changes (adjusts) less than a threshold/maximum tolerance (i.e., gradually). (4) Otherwise, if the received downlink timing has changed by more than the threshold (e.g., the UE measured a new cell and made the new cell its new camping cell, and therefore the UE has a new received downlink timing and a new RSRP for that cell), the UE may autonomously, and based on UE implementation, adjust the TA to obtain a new valid TA and a new reference RSRP for the RSRP change computation.

Referring further to rule (4), the autonomous TA adjustment should not be more than the measured downlink time difference between the downlink timing used to derive the previous valid TA and the new measured downlink timing. The new reference RSRP should not be different than the previous reference RSRP by more than a second threshold, otherwise, the UE should consider the new determined TA as invalid. In addition, the UE should perform downlink timing measurement on SSBs that are close-by in time (e.g., within a time window) to avoid clock time drift impacting the measurement accuracy. The measurement accuracy for this SSB-based RSTD may be specified in the applicable wireless communications standard.

When the UE makes the determination to update the previous valid TA to a new valid TA based on either the third or fourth rule above, the UE should also update the RSRP reference value that the UE will use going forward to determine whether the new valid TA is still valid in the future.

Figure 12:
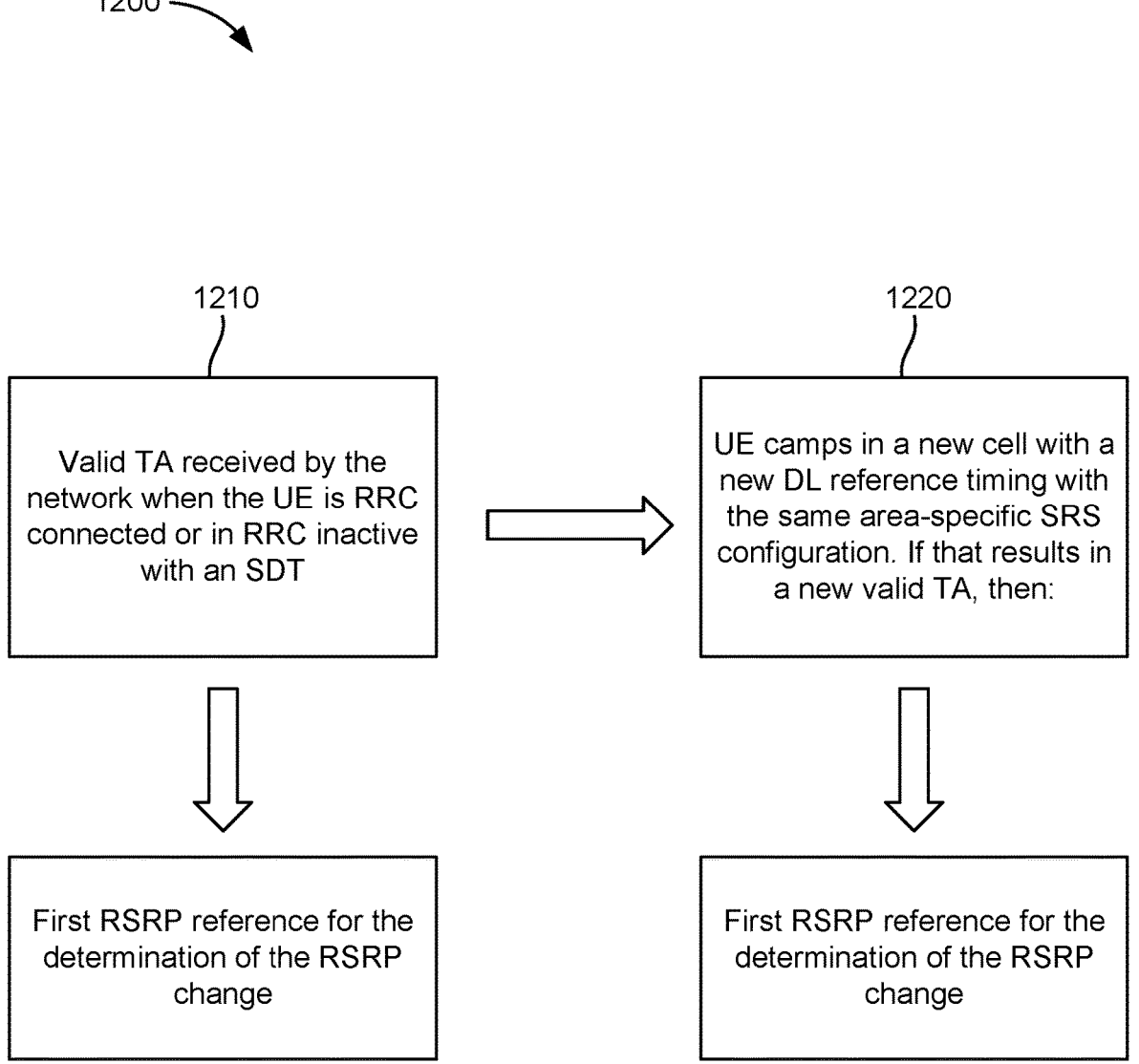
FIG. 12 is a diagram illustrating the fourth rule for determining a valid timing advance (TA) and a new reference reference signal received power (RSRP) for the RSRP change computation, according to aspects of the disclosure.

FIG. 12 is a diagram 1200 illustrating the fourth rule for determining a valid TA and a new reference RSRP for the RSRP change computation, according to aspects of the disclosure. As shown in FIG. 12, at stage 1210, the UE receives a valid TA from the network (e.g., the UE's current serving cell) when the UE is in RRC CONNECTED mode or in RRC non-connected mode (e.g., RRC INACTIVE state 430) with an SDT. In this case, there is a first RSRP reference for the determination/computation of the RSRP change.

At stage 1220, at some point in time later, the UE camps in a new cell with a new downlink reference timing but with the same SRS configuration (i.e., having the same area-specific SRS configuration). The UE then determines if either rule (3) or (4) above apply. Here, the UE determines that rule (4) applies, which results in a new valid TA. It also results in a second RSRP reference for the determination/computation of the RSRP change.

Note that the first cell and the second cell used for the downlink reference timing may be the same cell. In this case, a first downlink reference timing of the cell may be based on a first SSB from the cell and a second downlink reference timing of the cell may be based on a second SSB from the cell.

Figure 13:
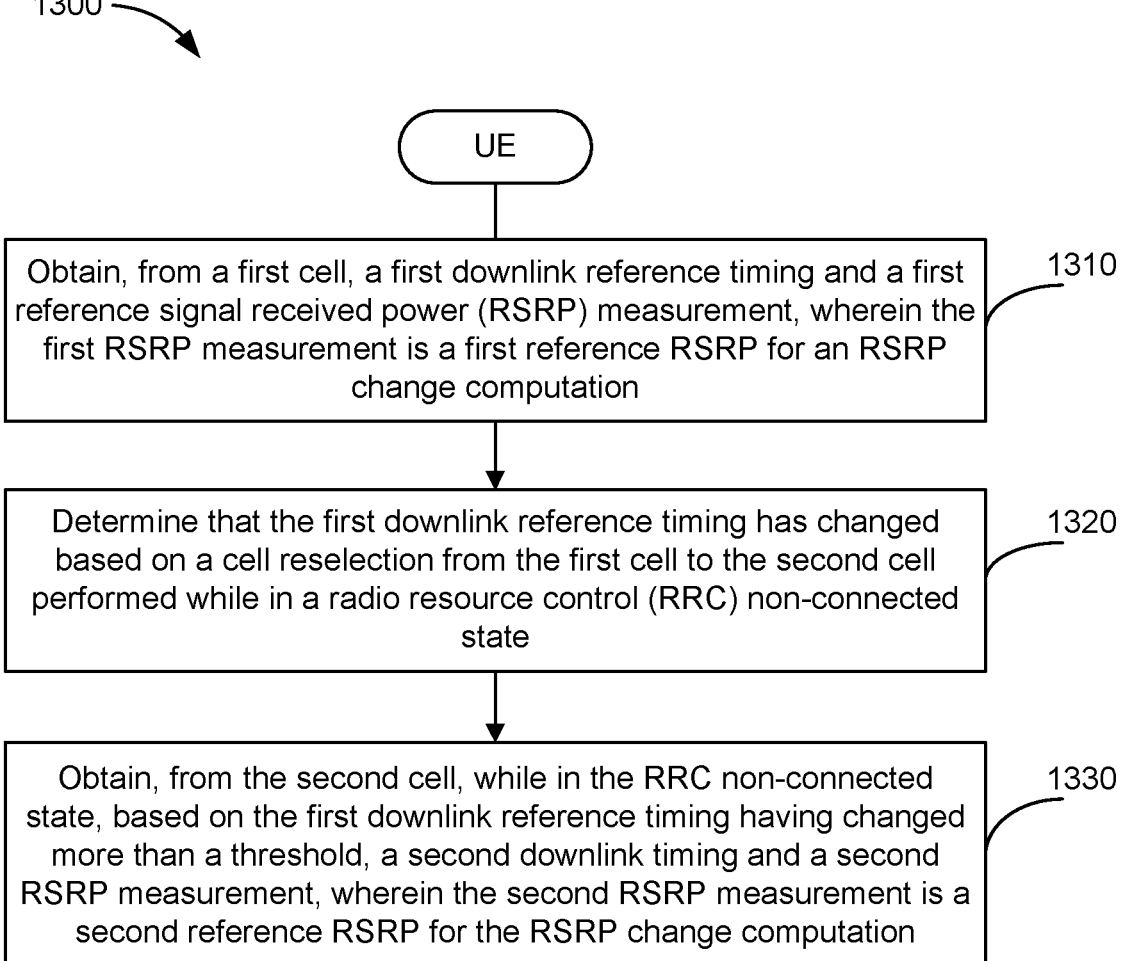
FIG. 13 illustrates an example method of wireless communication, according to aspects of the disclosure.

FIG. 13 illustrates an example method 1300 of wireless communication, according to aspects of the disclosure. In an aspect, method 1300 may be performed by a UE (e.g., any of the UEs described herein).

At 1310, the UE obtains, from a first cell, a first downlink reference timing and a first RSRP measurement, wherein the first RSRP measurement is a first reference RSRP for an RSRP change computation. In an aspect, operation 1310 may be performed by the one or more WWAN transceivers 310, the one or more processors 332, memory 340, and/or positioning component 342, any or all of which may be considered means for performing this operation.

At 1320, the UE determines that the first downlink reference timing has changed based on a cell reselection from the first cell to the second cell performed while in an RRC non-connected state. In an aspect, operation 1320 may be performed by the one or more WWAN transceivers 310, the one or more processors 332, memory 340, and/or positioning component 342, any or all of which may be considered means for performing this operation.

At 1330, the UE obtains, from the second cell, while in the RRC non-connected state, based on the first downlink reference timing having changed more than a threshold, a second downlink timing and a second RSRP measurement, wherein the second RSRP measurement is a second reference RSRP for the RSRP change computation. In an aspect, operation 1330 may be performed by the one or more WWAN transceivers 310, the one or more processors 332, memory 340, and/or positioning component 342, any or all of which may be considered means for performing this operation.

As will be appreciated, a technical advantage of the method 1300 is enabling the UE to autonomously adjust the reference RSRP when adjusting the valid TA.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: obtaining, from a first cell, a first downlink reference timing and a first reference signal received power (RSRP) measurement, wherein the first RSRP measurement is a first reference RSRP for an RSRP change computation; determining that the first downlink reference timing has changed based on a cell reselection from the first cell to a second cell performed while in a radio resource control (RRC) non-connected state; and obtaining, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

Clause 2. The method of clause 1, wherein the first cell is: a most recent serving cell, or a most recent camping cell.

Clause 3. The method of any of clauses 1 to 2, wherein the second cell is a new camping cell.

Clause 4. The method of any of clauses 1 to 3, further comprising: maintaining, while in the RRC non-connected state, based on the first downlink reference timing changing less than the threshold, a first valid timing advance (TA) and the first reference RSRP.

Clause 5. The method of clause 4, further comprising: determining, based on the first downlink reference timing having changed more than the threshold, a second valid TA based on the first valid TA and a second downlink reference timing such that a change to an uplink timing of the UE is less than a second threshold.

Clause 6. The method of clause 5, wherein a difference between the second valid TA and the first valid TA is less than or equal to a difference between the second downlink reference timing and the first downlink reference timing.

Clause 7. The method of any of clauses 5 to 6, wherein the second threshold is: configured to the UE, or based on subcarrier spacing (SCS), numerology, frequency range, frequency band, signal-to-noise ratio (SNR), RSRP level, or any combination thereof.

Clause 8. The method of any of clauses 1 to 7, wherein the threshold is: configured to the UE, or based on SCS, numerology, frequency range, frequency band, SNR, RSRP level, or any combination thereof.

Clause 9. The method of any of clauses 1 to 8, wherein the RSRP change computation comprises a determination of whether an RSRP measurement of a new camping cell is within an RSRP change threshold of a most recent reference RSRP.

Clause 10. The method of clause 9, wherein the RSRP change threshold is: configured to the UE, or based on SCS, numerology, frequency range, frequency band, SNR, RSRP level, or any combination thereof.

Clause 11. The method of any of clauses 1 to 10, wherein a difference between the second reference RSRP and the first reference RSRP is less than or equal to a second threshold.

Clause 12. The method of clause 11, wherein the second threshold is: configured to the UE, or based on SCS, numerology, frequency range, frequency band, SNR, RSRP level, or any combination thereof.

Clause 13. The method of any of clauses 1 to 12, wherein obtaining the first downlink reference timing comprises: measuring a plurality of synchronization signal blocks (SSBs) transmitted by the first cell within a time window, wherein a length of the time window is selected to avoid clock time drift impacting measurement accuracy.

Clause 14. The method of clause 13, wherein the measurement accuracy is of reference signal time difference (RSTD) measurements of the plurality of SSBs.

Clause 15. The method of any of clauses 1 to 14, wherein: the first cell and the second cell are a same cell, and the first downlink reference timing is based on a first SSB from the same cell and a second downlink reference timing is based on a second SSB from the same cell.

Clause 16. The method of any of clauses 1 to 15, wherein the second downlink timing and the second RSRP measurement are obtained based on the UE being configured with a configuration of one or more area-specific sounding reference signal (SRS) resources.

Clause 17. The method of any of clauses 1 to 16, wherein the RRC non-connected state comprises: an RRC INACTIVE state, or an RRC IDLE state.

Clause 18. A user equipment (UE), comprising: one or more memories; one or more transceivers; and one or more processors communicatively coupled to the one or more memories and the one or more transceivers, the one or more processors, either alone or in combination, configured to: obtain, from a first cell, a first downlink reference timing and a first reference signal received power (RSRP) measurement, wherein the first RSRP measurement is a first reference RSRP for an RSRP change computation; determine that the first downlink reference timing has changed based on a cell reselection from the first cell to a second cell performed while in a radio resource control (RRC) non-connected state; and obtain, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

Clause 19. The UE of clause 18, wherein the first cell is: a most recent serving cell, or a most recent camping cell.

Clause 20. The UE of any of clauses 18 to 19, wherein the second cell is a new camping cell.

Clause 21. The UE of any of clauses 18 to 20, wherein the one or more processors, either alone or in combination, are further configured to: maintain, while in the RRC non-connected state, based on the first downlink reference timing changing less than the threshold, a first valid timing advance (TA) and the first reference RSRP.

Clause 22. The UE of clause 21, wherein the one or more processors, either alone or in combination, are further configured to: determine, based on the first downlink reference timing having changed more than the threshold, a second valid TA based on the first valid TA and a second downlink reference timing such that a change to an uplink timing of the UE is less than a second threshold.

Clause 23. The UE of clause 22, wherein a difference between the second valid TA and the first valid TA is less than or equal to a difference between the second downlink reference timing and the first downlink reference timing.

Clause 24. The UE of any of clauses 22 to 23, wherein the second threshold is: configured to the UE, or based on subcarrier spacing (SCS), numerology, frequency range, frequency band, signal-to-noise ratio (SNR), RSRP level, or any combination thereof.

Clause 25. The UE of any of clauses 18 to 24, wherein the threshold is: configured to the UE, or based on SCS, numerology, frequency range, frequency band, SNR, RSRP level, or any combination thereof.

Clause 26. The UE of any of clauses 18 to 25, wherein the RSRP change computation comprises a determination of whether an RSRP measurement of a new camping cell is within an RSRP change threshold of a most recent reference RSRP.

Clause 27. The UE of clause 26, wherein the RSRP change threshold is: configured to the UE, or based on SCS, numerology, frequency range, frequency band, SNR, RSRP level, or any combination thereof.

Clause 28. The UE of any of clauses 18 to 27, wherein a difference between the second reference RSRP and the first reference RSRP is less than or equal to a second threshold.

Clause 29. The UE of clause 28, wherein the second threshold is: configured to the UE, or based on SCS, numerology, frequency range, frequency band, SNR, RSRP level, or any combination thereof.

Clause 30. The UE of any of clauses 18 to 29, wherein the one or more processors configured to obtain the first downlink reference timing comprises the one or more processors, either alone or in combination, configured to: measure a plurality of synchronization signal blocks (SSBs) transmitted by the first cell within a time window, wherein a length of the time window is selected to avoid clock time drift impacting measurement accuracy.

Clause 31. The UE of clause 30, wherein the measurement accuracy is of reference signal time difference (RSTD) measurements of the plurality of SSBs.

Clause 32. The UE of any of clauses 18 to 31, wherein: the first cell and the second cell are a same cell, and the first downlink reference timing is based on a first SSB from the same cell and a second downlink reference timing is based on a second SSB from the same cell.

Clause 33. The UE of any of clauses 18 to 32, wherein the second downlink timing and the second RSRP measurement are obtained based on the UE being configured with a configuration of one or more area-specific sounding reference signal (SRS) resources.

Clause 34. The UE of any of clauses 18 to 33, wherein the RRC non-connected state comprises: an RRC INACTIVE state, or an RRC IDLE state.

Clause 35. A user equipment (UE), comprising: means for obtaining, from a first cell, a first downlink reference timing and a first reference signal received power (RSRP) measurement, wherein the first RSRP measurement is a first reference RSRP for an RSRP change computation; means for determining that the first downlink reference timing has changed based on a cell reselection from the first cell to a second cell performed while in a radio resource control (RRC) non-connected state; and means for obtaining, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

Clause 36. The UE of clause 35, wherein the first cell is: a most recent serving cell, or a most recent camping cell.

Clause 37. The UE of any of clauses 35 to 36, wherein the second cell is a new camping cell.

Clause 38. The UE of any of clauses 35 to 37, further comprising: means for maintaining, while in the RRC non-connected state, based on the first downlink reference timing changing less than the threshold, a first valid timing advance (TA) and the first reference RSRP.

Clause 39. The UE of clause 38, further comprising: means for determining, based on the first downlink reference timing having changed more than the threshold, a second valid TA based on the first valid TA and a second downlink reference timing such that a change to an uplink timing of the UE is less than a second threshold.

Clause 40. The UE of clause 39, wherein a difference between the second valid TA and the first valid TA is less than or equal to a difference between the second downlink reference timing and the first downlink reference timing.

Clause 41. The UE of any of clauses 39 to 40, wherein the second threshold is: configured to the UE, or based on subcarrier spacing (SCS), numerology, frequency range, frequency band, signal-to-noise ratio (SNR), RSRP level, or any combination thereof.

Clause 42. The UE of any of clauses 35 to 41, wherein the threshold is: configured to the UE, or based on SCS, numerology, frequency range, frequency band, SNR, RSRP level, or any combination thereof.

Clause 43. The UE of any of clauses 35 to 42, wherein the RSRP change computation comprises a determination of whether an RSRP measurement of a new camping cell is within an RSRP change threshold of a most recent reference RSRP.

Clause 44. The UE of clause 43, wherein the RSRP change threshold is: configured to the UE, or based on SCS, numerology, frequency range, frequency band, SNR, RSRP level, or any combination thereof.

Clause 45. The UE of any of clauses 35 to 44, wherein a difference between the second reference RSRP and the first reference RSRP is less than or equal to a second threshold.

Clause 46. The UE of clause 45, wherein the second threshold is: configured to the UE, or based on SCS, numerology, frequency range, frequency band, SNR, RSRP level, or any combination thereof.

Clause 47. The UE of any of clauses 35 to 46, wherein the means for obtaining the first downlink reference timing comprises: means for measuring a plurality of synchronization signal blocks (SSBs) transmitted by the first cell within a time window, wherein a length of the time window is selected to avoid clock time drift impacting measurement accuracy.

Clause 48. The UE of clause 47, wherein the measurement accuracy is of reference signal time difference (RSTD) measurements of the plurality of SSBs.

Clause 49. The UE of any of clauses 35 to 48, wherein: the first cell and the second cell are a same cell, and the first downlink reference timing is based on a first SSB from the same cell and a second downlink reference timing is based on a second SSB from the same cell.

Clause 50. The UE of any of clauses 35 to 49, wherein the second downlink timing and the second RSRP measurement are obtained based on the UE being configured with a configuration of one or more area-specific sounding reference signal (SRS) resources.

Clause 51. The UE of any of clauses 35 to 50, wherein the RRC non-connected state comprises: an RRC INACTIVE state, or an RRC IDLE state.

Clause 52. A non-transitory computer-readable medium storing computer-executable instructions that, when executed by a user equipment (UE), cause the UE to: obtain, from a first cell, a first downlink reference timing and a first reference signal received power (RSRP) measurement, wherein the first RSRP measurement is a first reference RSRP for an RSRP change computation; determine that the first downlink reference timing has changed based on a cell reselection from the first cell to a second cell performed while in a radio resource control (RRC) non-connected state; and obtain, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

Clause 53. The non-transitory computer-readable medium of clause 52, wherein the first cell is: a most recent serving cell, or a most recent camping cell.

Clause 54. The non-transitory computer-readable medium of any of clauses 52 to 53, wherein the second cell is a new camping cell.

Clause 55. The non-transitory computer-readable medium of any of clauses 52 to 54, further comprising computer-executable instructions that, when executed by the UE, cause the UE to: maintain, while in the RRC non-connected state, based on the first downlink reference timing changing less than the threshold, a first valid timing advance (TA) and the first reference RSRP.

Clause 56. The non-transitory computer-readable medium of clause 55, further comprising computer-executable instructions that, when executed by the UE, cause the UE to: determine, based on the first downlink reference timing having changed more than the threshold, a second valid TA based on the first valid TA and a second downlink reference timing such that a change to an uplink timing of the UE is less than a second threshold.

Clause 57. The non-transitory computer-readable medium of clause 56, wherein a difference between the second valid TA and the first valid TA is less than or equal to a difference between the second downlink reference timing and the first downlink reference timing.

Clause 58. The non-transitory computer-readable medium of any of clauses 56 to 57, wherein the second threshold is: configured to the UE, or based on subcarrier spacing (SCS), numerology, frequency range, frequency band, signal-to-noise ratio (SNR), RSRP level, or any combination thereof.

Clause 59. The non-transitory computer-readable medium of any of clauses 52 to 58, wherein the threshold is: configured to the UE, or based on SCS, numerology, frequency range, frequency band, SNR, RSRP level, or any combination thereof.

Clause 60. The non-transitory computer-readable medium of any of clauses 52 to 59, wherein the RSRP change computation comprises a determination of whether an RSRP measurement of a new camping cell is within an RSRP change threshold of a most recent reference RSRP.

Clause 61. The non-transitory computer-readable medium of clause 60, wherein the RSRP change threshold is: configured to the UE, or based on SCS, numerology, frequency range, frequency band, SNR, RSRP level, or any combination thereof.

Clause 62. The non-transitory computer-readable medium of any of clauses 52 to 61, wherein a difference between the second reference RSRP and the first reference RSRP is less than or equal to a second threshold.

Clause 63. The non-transitory computer-readable medium of clause 62, wherein the second threshold is: configured to the UE, or based on SCS, numerology, frequency range, frequency band, SNR, RSRP level, or any combination thereof.

Clause 64. The non-transitory computer-readable medium of any of clauses 52 to 63, wherein the computer-executable instructions that, when executed by the UE, cause the UE to obtain the first downlink reference timing comprise computer-executable instructions that, when executed by the UE, cause the UE to: measure a plurality of synchronization signal blocks (SSBs) transmitted by the first cell within a time window, wherein a length of the time window is selected to avoid clock time drift impacting measurement accuracy.

Clause 65. The non-transitory computer-readable medium of clause 64, wherein the measurement accuracy is of reference signal time difference (RSTD) measurements of the plurality of SSBs.

Clause 66. The non-transitory computer-readable medium of any of clauses 52 to 65, wherein: the first cell and the second cell are a same cell, and the first downlink reference timing is based on a first SSB from the same cell and a second downlink reference timing is based on a second SSB from the same cell.

Clause 67. The non-transitory computer-readable medium of any of clauses 52 to 66, wherein the second downlink timing and the second RSRP measurement are obtained based on the UE being configured with a configuration of one or more area-specific sounding reference signal (SRS) resources.

Clause 68. The non-transitory computer-readable medium of any of clauses 52 to 67, wherein the RRC non-connected state comprises: an RRC INACTIVE state, or an RRC IDLE state.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A user equipment (UE), comprising:
one or more memories;
one or more transceivers; and
one or more processors communicatively coupled to the one or more memories and the one or more transceivers, the one or more processors, either alone or in combination, configured to:
obtain, from a first cell, a first downlink reference timing and a first reference signal received power (RSRP) measurement, wherein the first RSRP measurement is a first reference RSRP for an RSRP change computation;
determine that the first downlink reference timing has changed based on a cell reselection from the first cell to a second cell performed while in a radio resource control (RRC) non-connected state; and
obtain, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

2. The UE of claim 1, wherein the first cell is:
a most recent serving cell, or
a most recent camping cell.

3. The UE of claim 1, wherein the second cell is a new camping cell.

4. The UE of claim 1, wherein the one or more processors, either alone or in combination, are further configured to:
maintain, while in the RRC non-connected state, based on the first downlink reference timing changing less than the threshold, a first valid timing advance (TA) and the first reference RSRP.

5. The UE of claim 4, wherein the one or more processors, either alone or in combination, are further configured to:
determine, based on the first downlink reference timing having changed more than the threshold, a second valid TA based on the first valid TA and a second downlink reference timing such that a change to an uplink timing of the UE is less than a second threshold.

6. The UE of claim 5, wherein a difference between the second valid TA and the first valid TA is less than or equal to a difference between the second downlink reference timing and the first downlink reference timing.

7. The UE of claim 5, wherein the second threshold is:
configured to the UE, or
based on subcarrier spacing (SCS), numerology, frequency range, frequency band, signal-to-noise ratio (SNR), RSRP level, or any combination thereof.

8. The UE of claim 1, wherein the threshold is:
configured to the UE, or
based on SCS, numerology, frequency range, frequency band, SNR, RSRP level, or any combination thereof.

9. The UE of claim 1, wherein the RSRP change computation comprises a determination of whether an RSRP measurement of a new camping cell is within an RSRP change threshold of a most recent reference RSRP.

10. The UE of claim 9, wherein the RSRP change threshold is:

configured to the UE, or based on SCS, numerology, frequency range, frequency band, SNR, RSRP level, or any combination thereof.

11. The UE of claim 1, wherein a difference between the second reference RSRP and the first reference RSRP is less than or equal to a second threshold.

12. The UE of claim 11, wherein the second threshold is:

configured to the UE, or based on SCS, numerology, frequency range, frequency band, SNR, RSRP level, or any combination thereof.

13. The UE of claim 1, wherein the one or more processors configured to obtain the first downlink reference timing comprises the one or more processors, either alone or in combination, configured to:

measure a plurality of synchronization signal blocks (SSBs) transmitted by the first cell within a time window, wherein a length of the time window is selected to avoid clock time drift impacting measurement accuracy.

14. The UE of claim 13, wherein the measurement accuracy is of reference signal time difference (RSTD) measurements of the plurality of SSBs.

15. The UE of claim 1, wherein:

the first cell and the second cell are a same cell, and the first downlink reference timing is based on a first SSB from the same cell and a second downlink reference timing is based on a second SSB from the same cell.

16. The UE of claim 1, wherein the second downlink timing and the second RSRP measurement are obtained based on the UE being configured with a configuration of one or more area-specific sounding reference signal (SRS) resources.

17. The UE of claim 1, wherein the RRC non-connected state comprises:

an RRC INACTIVE state, or an RRC IDLE state.

18. A method of wireless communication performed by a user equipment (UE), comprising:

obtaining, from a first cell, a first downlink reference timing and a first reference signal received power (RSRP) measurement, wherein the first RSRP measurement is a first reference RSRP for an RSRP change computation;

determining that the first downlink reference timing has changed based on a cell reselection from the first cell to a second cell performed while in a radio resource control (RRC) non-connected state; and obtaining, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

19. The method of claim 18, further comprising:

maintaining, while in the RRC non-connected state, based on the first downlink reference timing changing less than the threshold, a first valid timing advance (TA) and the first reference RSRP.

20. A non-transitory computer-readable medium storing computer-executable instructions that, when executed by a user equipment (UE), cause the UE to:

obtain, from a first cell, a first downlink reference timing and a first reference signal received power (RSRP) measurement, wherein the first RSRP measurement is a first reference RSRP for an RSRP change computation;

determine that the first downlink reference timing has changed based on a cell reselection from the first cell to a second cell performed while in a radio resource control (RRC) non-connected state; and obtain, from the second cell, while in the RRC non-connected state, based on the first downlink reference timing having changed more than a threshold, a second downlink timing and a second RSRP measurement, wherein the second RSRP measurement is a second reference RSRP for the RSRP change computation.

\* \* \* \* \*